US012485719B1

(12) United States Patent
Castelaz et al.

(10) Patent No.: US 12,485,719 B1
(45) Date of Patent: Dec. 2, 2025

(54) HEAT PUMP VEHICLE THERMAL SYSTEM

(71) Applicant: Motiv Power Systems, Inc., Foster City, CA (US)

(72) Inventors: James Michael Castelaz, Alameda, CA (US); Brandon Tsuge, Foster City, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 179 days.

(21) Appl. No.: 18/304,657

(22) Filed: Apr. 21, 2023

Related U.S. Application Data

(63) Continuation-in-part of application No. 17/368,692, filed on Jul. 6, 2021, now abandoned, which is a continuation of application No. 15/694,735, filed on Sep. 1, 2017, now abandoned.

(60) Provisional application No. 62/382,775, filed on Sep. 1, 2016.

(51) Int. Cl.
*B60H 1/00* (2006.01)

(52) U.S. Cl.
CPC ..... *B60H 1/00271* (2013.01); *B60H 1/00278* (2013.01); *B60H 1/00392* (2013.01); *B60H 1/00907* (2013.01); *B60H 2001/00307* (2013.01); *B60H 2001/00928* (2013.01); *B60H 2001/00935* (2013.01); *B60H 2001/00942* (2013.01)

(58) Field of Classification Search
CPC ............ B60H 1/00907; B60H 1/00271; B60H 1/00278; B60H 1/00385
See application file for complete search history.

(56) References Cited

U.S. PATENT DOCUMENTS

| 5,526,650 A | 6/1996 | Iritani | B60H 1/00907 |
| | | | 62/205 |
| 6,089,034 A | 7/2000 | Lake | F25B 41/20 |
| | | | 62/204 |
| 6,367,272 B1 * | 4/2002 | Zeng | B60H 1/3208 |
| | | | 62/133 |

(Continued)

FOREIGN PATENT DOCUMENTS

| CN | 203727131 | | 7/2014 | |
| CN | 111016737 A | * | 4/2020 | ......... B60H 1/00271 |
| JP | 8178445 | | 6/1996 | |

*Primary Examiner* — Eric S Ruppert
(74) *Attorney, Agent, or Firm* — Adibi IP Group, PC; Amir V. Adibi; Andrew C. Palmer

(57) ABSTRACT

A heat pump vehicle thermal system comprises a battery pack thermal system, a two-phase refrigeration system, and a power electronics thermal system. When the outer environment is cold relative to the interior of the vehicle (cold ambient), the heat pump thermal system is controlled in a first mode where the two-phase refrigeration system transfers heat generated by the power electronics thermal system to either the battery pack thermal system or to the cabin or to both. When the outer environment is hot relative to the interior of the electric vehicle (hot ambient), the heat pump thermal system is controlled in a second mode where the two-phase refrigeration system absorbs heat from the battery pack thermal system and the cabin and transfers the absorbed heat to the ambient environment. In the second mode, no heat generated by the power electronics is transferred to either the cabin or the battery packs.

15 Claims, 20 Drawing Sheets

(56) References Cited

U.S. PATENT DOCUMENTS

| | | | |
|---|---|---|---|
| 2006/0123815 A1 | 6/2006 | Kim | F25B 13/00 62/200 |
| 2013/0139530 A1 | 6/2013 | Tutunoglu et al. | F25B 1/00 62/89 |
| 2015/0295285 A1 | 10/2015 | Tekeuchi | F25B 5/00 62/498 |
| 2016/0116192 A1* | 4/2016 | Kim | F25B 5/04 62/115 |
| 2019/0225047 A1 | 7/2019 | Porras | F25B 5/02 |

* cited by examiner

SYSTEM OPERATION IN COLD AMBIENT CONDITION

SYSTEM OPERATION IN HOT AMBIENT CONDITION

FIG. 5

HEAT VALUES OF ALL FOUR HEAT EXCHANGERS SHOULD SUM TO ZERO

| Ambient Temp (F) | System Control | FIRST HEAT EXCHANGER Batt. HE (kW) #1 | SECOND HEAT EXCHANGER Cabin HE (kW) #2 | Cabin HE Temp. (F) | THIRD HEAT EXCHANGER Ambient HE (kW) #3 | FOURTH HEAT EXCHANGER PwrE HE (kW) #4 | Variable Valve State | Relative Flow (Batt. Coolant vs. Cabin Fan) |
|---|---|---|---|---|---|---|---|---|
| 0 | Variable Valve | .3 | .6 | 130 | | -.3 | .6 Most coolant to PwrE HE #4 | Batt coolant pump controlled to pull enough heat from Batt HE to keep batteries warm |
| 15 | Variable Valve | .3 | .6 | 130 | | -.4 | .5 Most coolant to PwrE HE #4 | Batt coolant pump controlled to pull enough heat from Batt HE to keep batteries warm |
| 30 | Variable Valve | .3 | .5 | 130 | | -.4 | -.4 Most coolant to PwrE HE #4 | Batt coolant pump controlled to pull enough heat from Batt HE to keep batteries warm |
| 45 | Pump speed low | 0 | .4 | 33 | -.3 | -.1 | Split fluid | Batt coolant pump off |
| 60 | Pump speed low | 0 | .2 | 33 | -.1 | -.1 | Split fluid | Batt coolant pump off |
| 75 | Pump speed low | 0 | -.2 | 33 | 0 | .2 | All radiator | Batt coolant pump off |
| 90 | Pump speed med | 0 | -.4 | 33 | 0 | .4 | All radiator | Batt coolant pump off |
| 105 | Pump speed med | -.1 | -.6 | 33 | 0 | .7 | All radiator | Batt coolant pump controlled to push enough heat to Batt HE to keep batteries cool |
| 120 | Pump speed high | -.3 | -.8 | 46 | 0 | 1.1 | All radiator | Batt coolant pump controlled to push enough heat to Batt HE to keep batteries cool |
| 130 | Pump speed high | -.3 | -.8 | 51 | 0 | 1.1 | All radiator | Batt coolant pump controlled to push enough heat to Batt HE to keep batteries cool |

+ Positive heat exchanger value indicates heat moving OUT OF refrigeration system (i.e. providing heat to external thermal mass)

− Negative heat exchanger value indicates heat moving INTO refrigeration system (i.e. cooling external thermal mass)

(ANOTHER EMBODIMENT)

(ANOTHER EMBODIMENT)

SINGLE LOOP OPERATION
(ANOTHER EMBODIMENT)

TWO-LOOP OPERATION
(ANOTHER EMBODIMENT)

SET FAN SPEED

SET WEG PUMP SPEEDS

SET RADIATOR BYPASS AND CALCULATE PS3

EXAMPLE OF CALCULATION BLOCKS

|  | With Cabin Heat | Without Cabin Heat |
| --- | --- | --- |
| Single-loop mode | • Compressor speed controlled in order to drive $P_H$ to $P_H^*$<br>• Both pump speeds equal and controlled to drive $P_L$ to $P_L^*$<br>• When V is below $V^T$, the fan speed is controlled to drive $T_P$ to $T_S^*$<br>• Chiller on unless battery coolant drops below $T_L$ | • Compressor speed controlled in order to drive $P_H$ to $P_H^*$<br>• When V is below $V^T$, the fan speed is controlled to drive $P_L$ to $P_L^*$<br>• Both pump speeds equal and controlled to drive $T_P$ to $T_S^*$, subject to a minimum pump speed which depends on vehicle speed<br>• Chiller off unless battery coolant goes above $T_S^{TH}$ |
| Dual-loop mode | • Compressor speed controlled in order to drive $P_H$ to $P_H^*$<br>• When V is below $V^T$, the fan speed and motor pump speed are controlled to drive $T_P$ to $T_S^*$<br>• Battery pump speed is set based on vehicle speed<br>• Chiller on unless battery coolant drops below $T_L$ | • Compressor speed controlled in order to drive $P_H$ to $P_H^*$<br>• When V is below $V^T$, the fan speed is controlled to drive $P_L$ to $P_L^*$<br>• Motor pump speed controlled to drive $T_P$ to $T_D^*$<br>• Battery pump speed is set based on vehicle speed<br>• Chiller off unless battery coolant goes above $T_S^{TH}$ |

THERMAL SYSTEM CONTROL FUNCTIONS
BASED ON STATE OF FOUR-WAY VALVE

FIG. 18

| | |
|---|---|
| V | VEHICLE SPEED |
| $T_B$ | BATTERY COOLANT TEMPERATURE |
| $P_H$ | HIGH SIDE PRESSURE |
| $P_L$ | LOW SIDE PRESSURE |
| $T_P$ | POWERTRAIN COOLANT TEMPERATURE |
| $T_{AMB}$ | AMBIENT TEMPERATURE |

TABLE OF SENSED PARAMETERS
FIG. 19A

| | |
|---|---|
| $T_S^{TH}$ | MAXIMUM ALLOWABLE COOLANT TEMPERATURE IN SINGLE-LOOP MODE (E.G. 27°C) |
| $T_D^{TH}$ | MINIMUM ALLOWABLE BATTERY COOLANT TEMPERATURE IN DUAL-LOOP MODE (E.G. 25°C) |
| $T_S^*$ | MAXIMUM TARGET TEMPERATURE FOR COOLANT IN SINGLE-LOOP MODE. IN ONE EMBODIMENT, $T_S^*$ IS THE SAME AS $T_D^{TH}$ |
| $T_D^*$ | TARGET TEMPERATURE FOR POWERTRAIN COOLANT IN DUAL-LOOP MODE |
| $P_L^*$ | LOW SIDE PRESSURE SETPOINT |
| $P_H^*$ | HIGH SIDE PRESSURE SETPOINT |
| SP | STATE: SP=1 (SINGLE-LOOP MODE), SP=2 (DUAL-LOOP MODE) |
| $T_L$ | MINIMUM ALLOWABLE TEMPERATURE FOR BATTERY COOLANT |
| HPS | HIGHER SPEED SETPOINT FOR BATTERY COOLANT PUMP |
| LPS | LOWER SPEED SETPOINT FOR BATTERY COOLANT PUMP |
| $V^T$ | VEHICLE SPEED THRESHOLD |

TABLE OF STORED PARAMETERS
FIG. 19B

MODE SWITCHING WITH HYSTERESIS BASED
ON THRESHOLD COMPARISONS

HEAT PUMP VEHICLE THERMAL SYSTEM

CROSS REFERENCE TO RELATED APPLICATIONS

This application is a continuation-in-part (CIP) of U.S. patent application Ser. No. 17/368,692, entitled "Heat Pump Vehicle Thermal System," filed Jul. 6, 2021. Application Ser. No. 17/368,692 is a continuation of, and claims the benefit under 35 U.S. C. § 120 from, U.S. patent application Ser. No. 15/694,735, entitled "Heat Pump Vehicle Thermal System," filed Sep. 1, 2017. U.S. patent application Ser. No. 15/694,735 claims the benefit under 35 U.S.C. § 119 from U.S. Provisional Patent Application No. 62/382,775, entitled "HEAT PUMP VEHICLE THERMAL SYSTEM," filed on Sep. 1, 2016. The subject matter of each of the foregoing documents is expressly incorporated herein by reference.

TECHNICAL FIELD

The present disclosure relates to thermal systems, and to related methods.

BACKGROUND INFORMATION

Electric vehicles often use energy storage systems, such as battery packs, as a source of energy to drive an electric motor and power electronics. Electric vehicles operate over a spectrum of ambient environments that vary in temperature. In cold ambient environments, drivers and passengers prefer a heated cabin, whereas in hot ambient environments, drivers and passengers prefer a cooled cabin. Battery pack operation is usually more efficient in certain thermal environments than in others. With many battery pack technologies, efficient operating temperatures correlate with passenger preference. For example, in cold ambient temperatures, battery packs may operate more efficiently if heated just as passengers prefer heat, and in warm ambient temperatures, battery packs may operate more efficiently with cooling just as passengers prefer cooling. For both passenger comfort and operational efficiency of battery packs, thermal management of both cabin and batteries is desirable. However, resistive heating and other conventional techniques are inefficient and waste substantial amounts of energy that could instead be used to increase vehicle range. A more robust solution is desired.

SUMMARY

A heat pump thermal system comprises a power source thermal system, a two-phase refrigeration system, and a heat-generating thermal system. In one example, the heat pump thermal system is part of an electric vehicle. In the example of an electric vehicle, the power source thermal system is a battery pack thermal system and the heat-generating thermal system is a powertrain thermal system. An outer environment that surrounds the electric vehicle is referred to as "ambient". The heat pump thermal system is operable in a selectable one of two modes.

The heat pump thermal system is controlled in a first mode during a cold ambient condition. In the cold ambient condition, the ambient (or outer environment) is cold relative to a temperature desired for an interior, or cabin, of the electric vehicle. During the cold ambient conditions, it is desirable to warm the cabin. Warming the cabin provides comfort to the passengers. In the first mode, the heat pump thermal system is controlled to draw heat from a heat source, such as a motor or power converter connected to the powertrain thermal system, and move that heat into the cabin. The heat from the heat source flows through the powertrain thermal system, then through the battery pack thermal system, and finally through the two-phase refrigeration system into the cabin. This causes the cabin to be heated using heat generated by the heat source.

The heat pump thermal system is controlled in a second mode during a hot ambient condition. In the hot ambient condition, the ambient environment is hot relative to a desired temperature for the cabin of the electric vehicle. During the hot ambient condition, it is desirable to cool the cabin and the battery packs. Cooling the cabin provides comfort to the passengers and cooling the battery packs relative to ambient tends to improve their longevity and operating efficiency. In the second mode, the two-phase refrigeration system absorbs heat from the battery pack thermal system and cabin and transfers the absorbed heat to the ambient environment. This causes the battery pack thermal system and the cabin to be cooled. In the second mode, the heat generated by the power electronics thermal system is released to the ambient environment and is not transferred to either the cabin or the battery packs.

In one embodiment, a two-phase refrigeration system comprises a compressor, a reversing valve, a first heat exchanger, a second heat exchanger, a third heat exchanger, a fourth heat exchanger, and an expansion valve. The first heat exchanger exchanges heat with the battery packs. The second heat exchanger exchanges heat with the cabin. The third heat exchanger exchanges heat with the ambient environment. The fourth heat exchanger exchanges heat with power electronics and/or the motor. The first and second heat exchangers are coupled to a first terminal of the expansion valve and the third and fourth heat exchangers are coupled to a second terminal of the expansion valve. The first terminal of the expansion valve is opposite the second terminal of the expansion valve. Neither the first heat exchanger nor the second heat exchanger is coupled to the second terminal of the expansion valve. Neither the third heat exchanger nor the fourth heat exchanger is coupled to the first terminal of the expansion valve. In one example, the expansion valve has two and only two terminals.

In operation, the reversing valve of the two-phase refrigeration system determines whether the two-phase refrigeration system is operating in the first mode or the second mode. In the first mode of operation, a fluid flows through the compressor, through the first and second heat exchangers, through the expansion valve, and through the third and fourth heat exchangers. This causes heat to be absorbed from the power electronics thermal system and causes heat to be transferred to the cabin and the battery packs. In the second mode, a fluid flows through the compressor, through the third and/or fourth heat exchangers, through the expansion valve, and through the first and second heat exchanger. This causes heat to be absorbed from the cabin and the battery packs.

In another embodiment, other valves within the two-phase refrigeration system are actuated to determine whether the system is operating in the first mode or the second mode. Other valves may include valves to allow or block flow through a thermal expansion valve and valves to allow or block flow through one of the heat exchangers. Other valves may be of a rotary or solenoid construction. In the first mode of operation, a fluid flows through the compressor, through the third heat exchanger, through the expansion valve, and through the first and/or second heat exchanger. This causes heat to be transferred to the cabin. In the second mode, a fluid flows through the compressor, through the fourth heat exchanger, through the expansion valve, and through the first and/or second heat exchanger. This causes heat to be absorbed from the cabin and the battery packs. In some embodiments the first heat exchanger and the fourth heat exchanger may be used as "chiller" heat exchangers. In other embodiments where there is only one "chiller" heat exchanger (the first heat exchanger), the third heat exchanger may be used as a cabin condenser and the fourth heat exchanger may be used as an ambient condenser.

In accordance with another novel aspect, a thermal system controller controls the novel heat pump thermal system in the first mode and in the second mode. The thermal system controller comprises an amount of dedicated hardware that receives system temperature information and in response generates and supplies control signals to the thermal system thereby causing the thermal system to operate in either the first mode or the second mode. The system temperature information comprises at least one of ambient temperature information, cabin temperature information, power electronics temperature information, motor temperature information, battery pack temperature information, and coolant temperature information. At least one of the control signals generated by the amount of dedicated hardware is supplied to a component of the thermal system selected from the group consisting of: a compressor, an on/off two-way valve, a three-way valve, a four-way valve, a variable flow valve, a coolant pump, and a fan. In one example, the thermal system controller is part of an electric vehicle thermal system and is powered entirely by batteries internal to the electric vehicle. The thermal system controller of the electric vehicle thermal system has at least one terminal that receives temperature information and at least one terminal that outputs a control signal that is supplied to the heat pump thermal system.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 is a table 60 illustrating methods of operating system 10.

FIG. 18 shows various control functions for use with a heat pump vehicle thermal system having a four-way valve.

FIG. 19A shows various sensed parameters for use with a heat pump vehicle thermal system having a four-way valve.

FIG. 19B shows various stored parameters for use with a heat pump vehicle thermal system having a four-way valve.

DETAILED DESCRIPTION

Reference will now be made in detail to some embodiments of the invention, examples of which are illustrated in the accompanying drawings.

Figure 1:
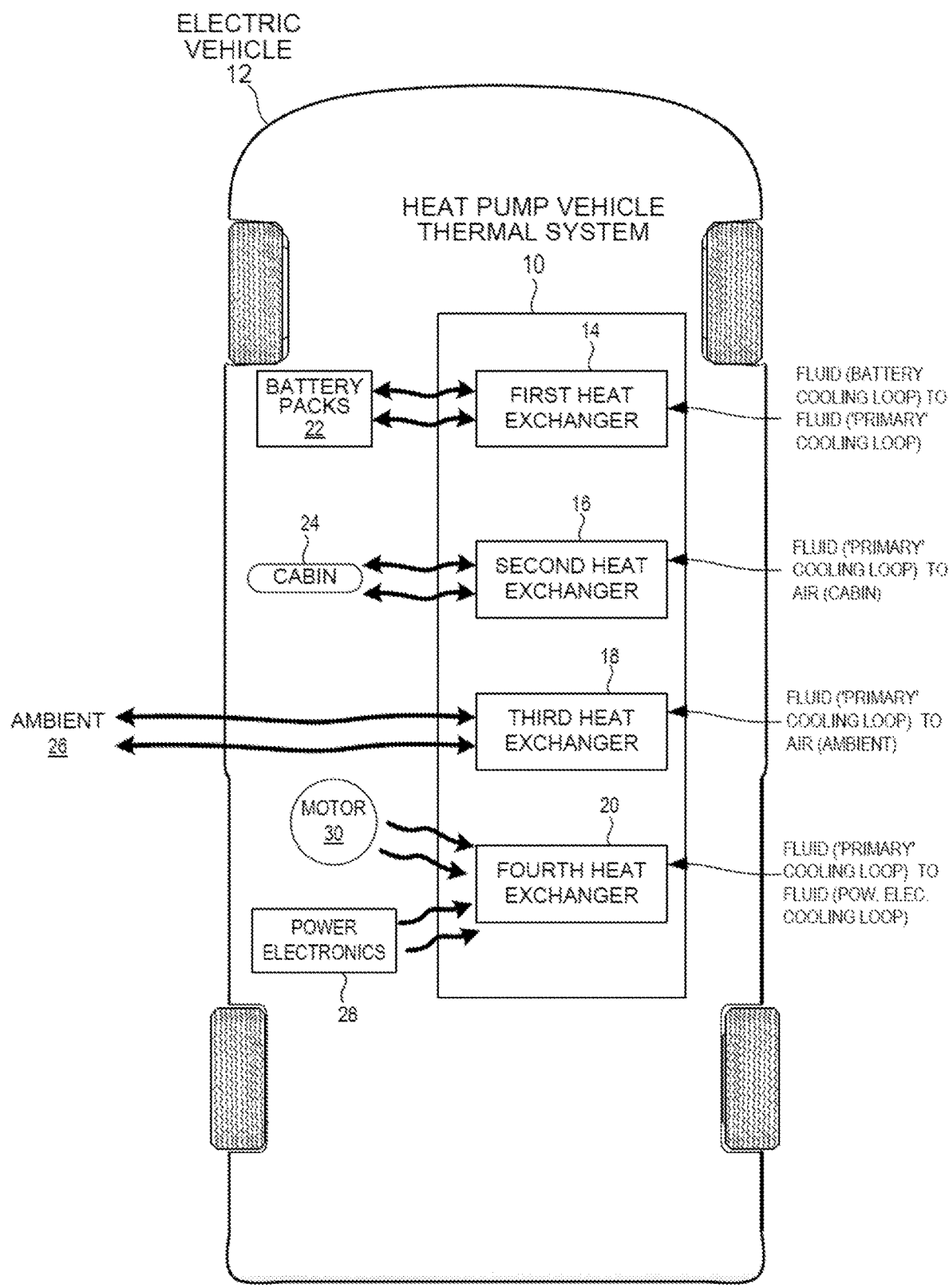
FIG. 1 is a high-level diagram of a heat pump vehicle thermal system 10.

FIG. 1 is a high-level diagram of a heat pump vehicle thermal system 10. System 10 is part of electric vehicle 12. System 10 comprises a first heat exchanger 14, a second heat exchanger 16, a third heat exchanger 18, and a fourth heat exchanger 20. First heat exchanger 14 is operable to absorb heat from (cool) or release heat to battery packs 22 of vehicle 12. Second heat exchanger 16 is operable to absorb heat from (cool) or release heat to cabin 24 of vehicle 12. Cabin 24 is the area enclosing drivers and passengers of vehicle 10. Third heat exchanger 18 is operable to absorb heat from (cool) or release heat to ambient 26. Ambient 26 refers to the surrounding environment of the system 10. Fourth heat exchanger 20 is operable to absorb heat from (cool) power electronics 28 and motor 30 of vehicle 12.

In accordance with one novel aspect, system 10 is operable to utilize heat generated by power electronics 28 and motor 30 of vehicle 12 to heat cabin 24 and battery packs 22 of vehicle 12. For example, when the ambient 26 temperature is colder than the interior of the vehicle, it is desirable to heat both the driver and passengers in cabin 24 to ensure that driver and passengers are comfortable. In a cold ambient condition, it is also desirable to heat battery packs 22 to ensure that battery packs 22 are operating in an environment conducive to efficient operation. Rather than provide a resistive heating element, system 10 utilizes heat generated by power electronics 28 and motor 30 as a heat source to provide heat to passengers in cabin 24 and to battery packs 22. Instead of wasting heat generated by power electronics 28 and motor 30 by releasing the generated heat to the surrounding environment, the generated heat is used to warm the vehicle interior.

System 10 is described in detail below with respect to a specific electric vehicle application. An artisan of ordinary skill in the art will appreciate that system 10 is applicable in any thermal management system, including other vessels, such as aircrafts, and buildings, such as commercial real estate. Although motors and electrical components provide a heat source to system 10, in other examples, other heat-generating bodies are used as the heat source. The novel techniques below are particularly advantageous where components of a system generate heat during operation of the system and where another part of the system requires thermal management. Accordingly, other applications may involve less than four heat exchangers.

Figure 2:
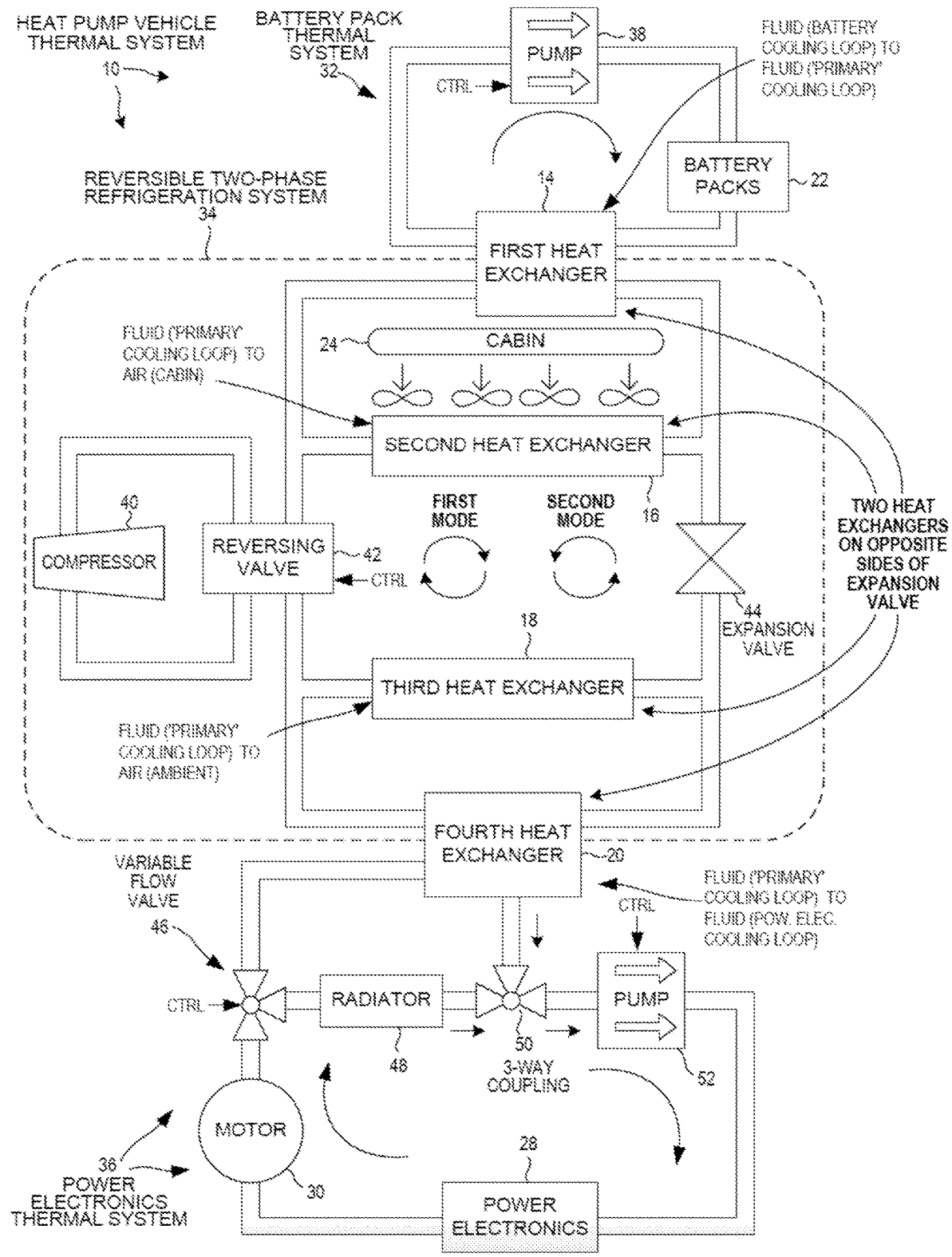
FIG. 2 is a detailed diagram of the heat pump vehicle thermal system 10.

FIG. 2 is a detailed diagram of the heat pump vehicle thermal system 10. System 10 includes a battery pack thermal system 32, a reversible two-phase refrigeration system 34, and a power electronics thermal system 36. Battery pack thermal system 32 includes pump 38 and battery packs 22. Reversible two-phase refrigeration system 34 comprises first heat exchanger 14, second heat exchanger 16, expansion valve 44, third heat exchanger 18, fourth heat exchanger 20, compressor 40, and reversing valve 42. Power electronics thermal system 36 comprises variable flow valve 46, radiator 48, three-way coupling 50, heat pump 52, power electronics 28, and motor 30. Control signals CTRL are shown supplied to pumps 38 and 52, reversing valve 42, and variable flow valve 46, indicating these components are controllable via software or hardware. Radiator 48 has a different label than the heat exchangers 14, 16, 18, and 20 but also performs a heat exchange function, and in some embodiments, radiator 48 is identical to the heat exchangers 14, 16, 18, and 20. The heat exchangers 14, 16, 18, and 20, expansion valve 44, and reversing valve 42 are bidirectional and conduct fluid in both clockwise and counterclockwise directions. Each system additionally includes thermal fluid (not shown) for heat transfer.

The reversible two-phase refrigeration system 34 is operable in a first mode and in a second mode. Reversible two-phase refrigeration system 34 is controlled to operate in the first mode when electric vehicle 12 is in a cold ambient condition thereby causing cabin 24 and battery packs 22 to heat. The relative heat being delivered to the cabin 24 versus the battery packs 22 is controlled by the relative performance of the first heat exchanger 14 and the second heat exchanger 16, which is determined by the battery pack fluid flow rate through the first heat exchanger 14 and by air flow rate over the second heat exchanger 16. In the first mode, fluid flows in a clockwise direction through reversible two-phase refrigeration system 34 causing heat to transfer from reversible two-phase refrigeration system 34 to battery pack thermal system 32 and to cabin 24. The heat is transferred into the reversible two-phase refrigeration system 34 from the third heat exchanger 18 and fourth heat exchanger 20, which draw heat from the ambient 26 and from the power electronics thermal system 36, respectively. The relative heat being taken from the ambient 26 versus the power electronics thermal system 36 is controlled by the relative performance of the third heat exchanger 18 and the fourth heat exchanger 20, which is determined by the power electronics thermal system fluid flow rate through the third heat exchanger 18 and by air flow rate over the fourth heat exchanger 20.

Reversible two-phase refrigeration system 34 is controlled to operate in the second mode when electric vehicle 12 is in a hot ambient condition thereby causing cabin 24 and battery packs 22 to cool. In the second mode, fluid flows in a counter-clockwise direction through reversible two-phase refrigeration system 34 causing heat to be absorbed from battery pack thermal system 32 and cabin 24 and into reversible two-phase refrigeration system 34, thereby cooling cabin 24 and battery packs 22. This heat is moved to the third heat exchanger 18, where it is transferred to ambient 26.

Reversing valve 42 controls whether reversible two-phase refrigeration system 34 is operating in the first mode or in the second mode. Reversing valve 42 is a four-port device having two inlets and two outlets. The first and second heat exchangers 14 and 16 are on one side of reversing valve 42, and the third and fourth heat exchangers 18 and 20 are on an opposite side of reversing valve 42.

Expansion valve 44 is used to decrease the pressure of the fluid flowing through reversible two-phase refrigeration system 34 prior to entering an evaporation stage of the heat exchangers. First and second heat exchangers 14 and 16 and third and fourth heat exchangers 18 and 20 are on opposite sides of expansion valve 44.

Compressor 40 is used to compress the fluid flowing through reversible two-phase refrigeration system 34 thereby increasing its pressure and temperature prior to entering a condensing stage of the heat exchangers. First and second heat exchangers 14 and 16 and third and fourth heat exchangers 18 and 20 are on opposite sides of compressor 40.

With respect to battery pack thermal system 32, pump 38 controls a flow rate of the fluid flowing through system 32. The flow rate may be increased to increase the amount of heat transfer between battery pack thermal system 32 and first heat exchanger 14, or decreased to decrease the amount of heat transfer. Fluid flows through battery pack thermal system 32 in a clockwise direction.

With respect to power electronics thermal system 36, three-way coupling 50 has three ports coupled to fourth heat exchanger 20, radiator 48, and pump 52. Pump 52 controls a flow rate of the fluid flowing through system 36. Variable flow valve 46 is a three-port valve having one inlet port and two outlet ports coupled-one coupled to transfer fluid to radiator 48 and another coupled to transfer fluid to fourth heat exchanger 20. The valve 46 may be varied to direct more fluid to the fourth heat exchanger 20 and increase the heat transfer through the fourth heat exchanger 20, or to direct more fluid flow to the radiator 48 and reduce the heat transfer through the fourth heat exchanger 40. Fluid flows through power electronics thermal system 36 in a clockwise direction.

Figure 3:
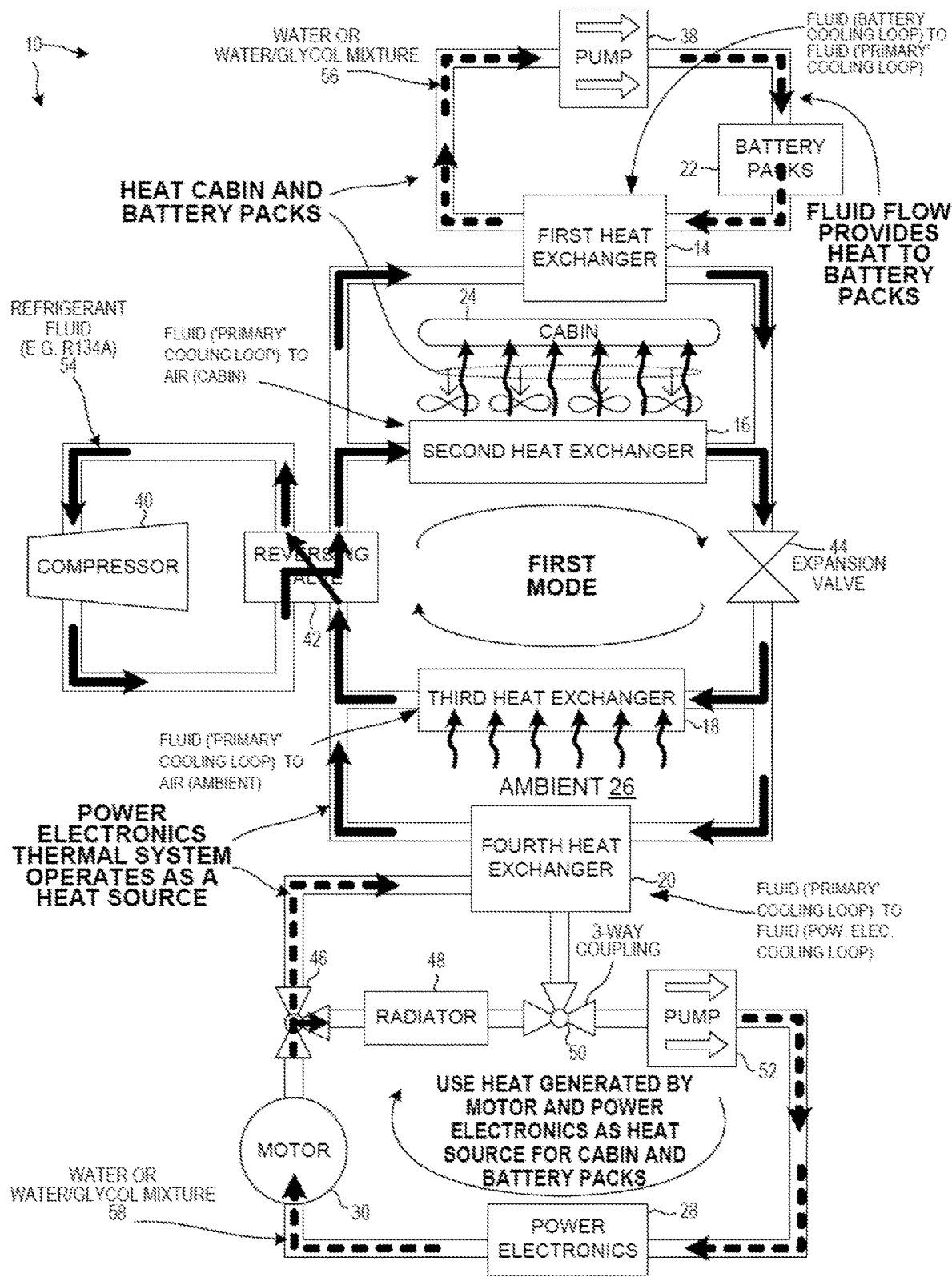
FIG. 3 is a diagram showing how fluids flow through system 10 when two-phase refrigeration system 34 is operating in the first mode.

FIG. 3 is a diagram showing how fluids flow through system 10 when reversible two-phase refrigeration system 34 is operating in the first mode. In a cold ambient condition, it is desirable to heat cabin 24 and battery packs 22. Reversing valve 42 is controlled such that refrigerant fluid 54 flows through compressor 40, through reversing valve 42, through second heat exchanger 16 operating in a condenser stage, through expansion valve 44, and through third and fourth heat exchangers 18 and 20 operating in an evaporating stage. Third heat exchanger 18 absorbs heat from ambient 26 and fourth heat exchanger 20 absorbs heat from power electronics thermal system 36. Fourth heat exchanger 20 transfers heat from fluid 58 flowing through power electronics thermal system 36 to refrigerant fluid 54. If too much heat is being transferred to the battery packs 22 or cabin 24, then the variable flow valve 46 can be controlled to divert a greater portion of fluid 58 to radiator 48, causing more of the generated heat to dissipate to ambient 26 through radiator 48. In this example, refrigerant fluid 54 is R134A refrigerant fluid.

Cabin 24 is heated via second heat exchanger 16. Second heat exchanger 16 operates in a condenser stage and rejects heat via fans (illustrated) into cabin 24. Warm air provided to cabin 24 warms driver and passengers. Battery packs 22 are heated by absorbing heat from fluid 56 flowing through battery pack thermal system 32. First heat exchanger 14 absorbs heat from refrigerant fluid 54 and transfers this absorbed heat to fluid 56. Battery packs 22 can be heated at an increased rate by increasing the flow rate of fluid 56 through the battery pack thermal system 32. In one example, fluids 56 and 58 are water. In another example, fluids 56 and 58 are mixtures of water and glycol. Accordingly, power electronics thermal system 36 operates as a heat source in the first mode.

Figure 4:
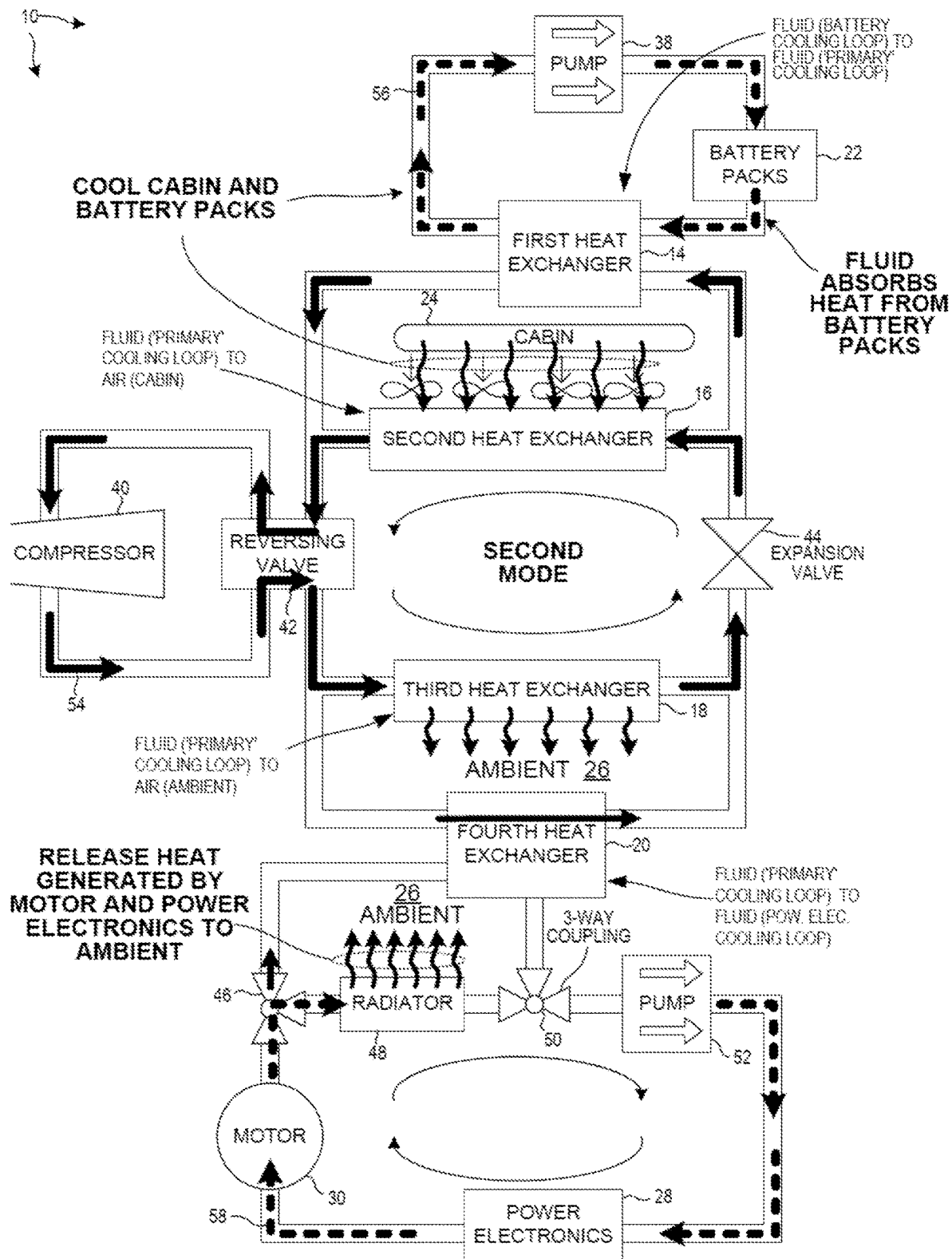
FIG. 4 is a diagram showing how fluids flow through system 10 when two-phase refrigeration system 34 is operating in the second mode.

FIG. 4 is a diagram showing how fluids flow through system 10 when reversible two-phase refrigeration system 34 is operating in the second mode. In a hot ambient condition, it is desirable to cool cabin 24 and battery packs 22. Reversing valve 42 is controlled such that refrigerant fluid 54 flows through compressor 40, through reversing valve 42, through third and fourth heat exchangers 18 and 20 operating in a condenser stage, through expansion valve 44, and through first and second heat exchangers 14 and 16 operating in an evaporating stage. Third heat exchanger 18 releases heat to ambient 26.

Cabin 24 is cooled via second heat exchanger 16. Second heat exchanger 16 operates as an evaporator stage and absorbs heat from cabin 24. By absorbing heat from cabin 24, cabin 24 is cooled for driver and passengers. Battery packs 22 are cooled by releasing heat to fluid 56 flowing through battery pack thermal system 32. First heat exchanger 14 releases heat to refrigerant fluid 54 thereby cooling fluid 56. Fluid 56 absorbs heat from battery packs 22 thereby cooling the battery packs 22. Battery packs 22 can be cooled at an increased rate by increasing the flow rate of fluid 56 through the battery pack thermal system 32.

In the second mode, power electronics thermal system 36 releases heat from power electronics 28 and motor 30 via radiator 48 to ambient 26. Variable flow valve 46 can optionally be controlled to divert a portion of fluid 58 to fourth heat exchanger 20, though this is unlikely due to the desirability of cooling the vehicle 12 and the undesirability of moving heat from the power electronics thermal system 36 into the fourth heat exchanger 20 in this operating mode. Power electronics 28 and motor 30 can be cooled at an increased rate by increasing the flow rate of fluid 58 through power electronics thermal system 36.

FIG. 5 is a table 60 illustrating methods of operating system 10. For each ambient temperature set forth in table 60, corresponding control techniques, energy transfer information for the four heat exchangers 14, 16, 18, and 20, operating modes of variable valve 46 (in power thermal system 36), and relative flow between fluid 56 (in battery thermal system 32) and cabin fan (illustrated in figures) is provided. A positive heat exchanger value indicates that heat is flowing out of two-phase refrigeration system 34. A negative heat exchanger value indicates that heat is flowing into the two-phase refrigeration system 34. The sum of all four heat exchanger values must sum to zero. In this example, the heat produced by the compressor 40 is considered negligible.

At colder temperatures (below 15° F.), system 10 is controlled to transfer all heat generated by power electronics 28 and motor 30 into cabin 24 and batteries 22. During operation, if the electronics 28 and motor 30 are generating too much heat, then heat can be released to ambient 26 via radiator 48 by controlling variable flow valve 46. Generally, no battery heating and minimal battery cooling is provided when ambient 26 is between 45° F. and 90° F.

Figure 6:
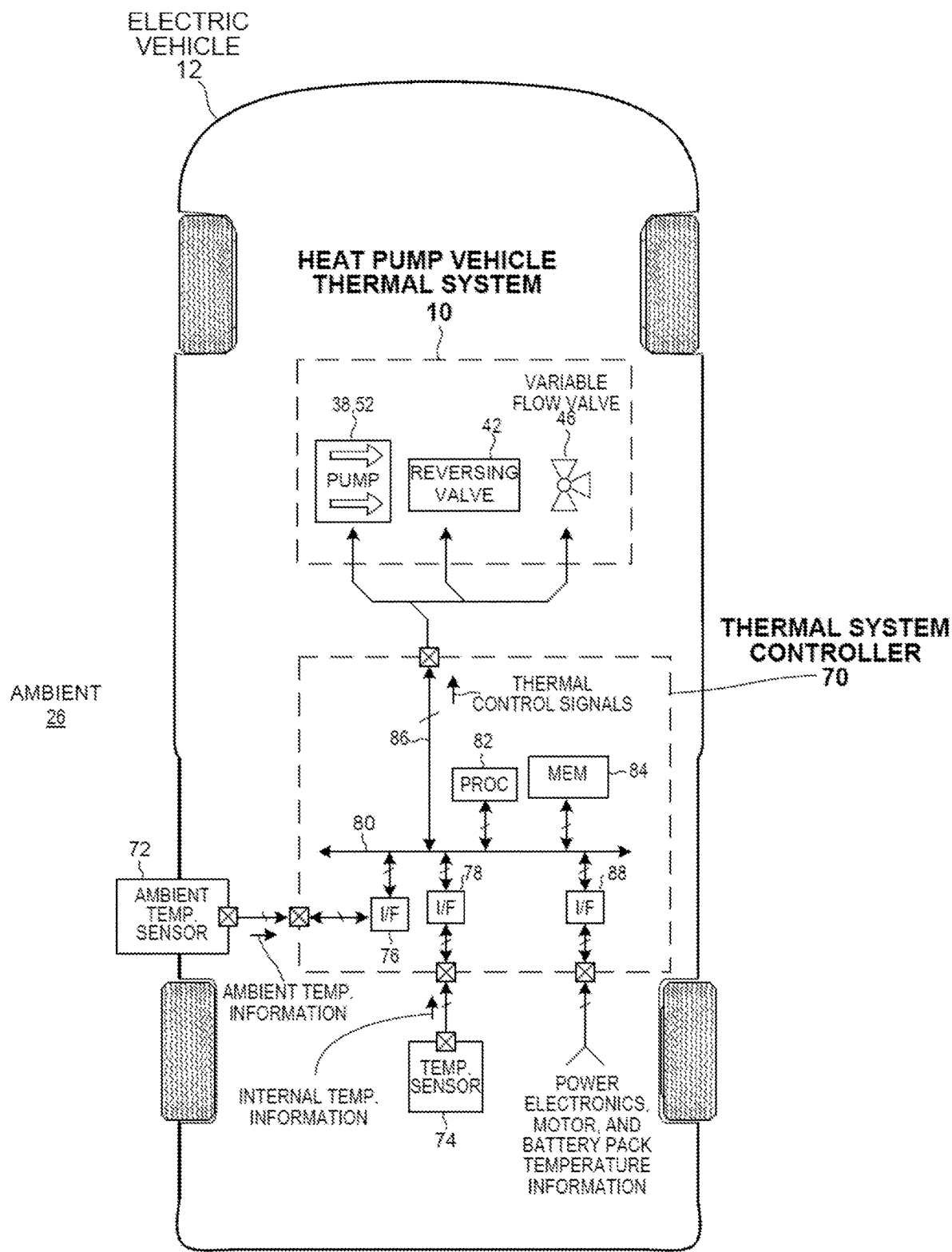
FIG. 6 is a detailed diagram of a thermal system controller 70 for performing the operating methods set forth in table 60.

FIG. 6 is a detailed diagram of a thermal system controller 70 for performing the operating methods set forth in table 60. Thermal system controller 70 receives ambient temperature information from ambient temperature sensor 72, receives internal temperature information from internal temperature sensor 74, and receives temperature information of power electronics, motors, and battery packs via other sensors (not shown). Controller 70 includes interface circuitry 76, 78, and 88, local bus 80, processor 82, and memory 84. Memory 84 is a processor readable medium that stores a set of computer-executable instructions that perform the operating methods described in table 60. Processor 82 reads the set of instructions from memory 84 via local bus 80. Processor 82 uses the ambient temperature information, the internal temperature information, and power electronics, motor, and battery pack temperature information to generate thermal control signals. Thermal control signals control heat pumps 38 and 52, reversing valve 42, and variable flow valve 46 to operate in accordance with table 60. The heat pumps 38 and 52, reversing valve 42, and variable flow valve 46 are controlled via digital signals communicated over communication bus 86. Controller 70 may be implemented in software, or as a microcontroller, ASIC, or as an amount of discrete digital logic devices.

Figure 7:
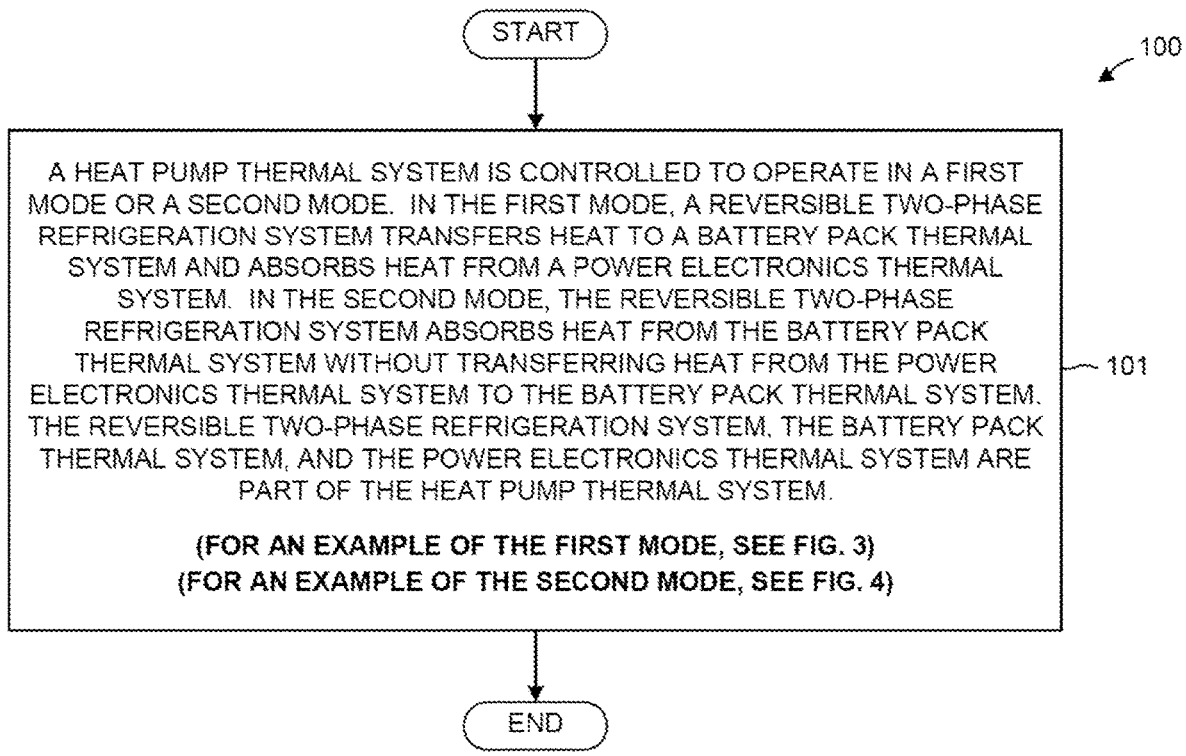
FIG. 7 is flowchart of a method 100 in accordance with another novel aspect.

FIG. 7 is flowchart of a method 100 in accordance with another novel aspect. In a first step (step 101), a heat pump thermal system is controlled to operate in a first mode or a second mode. In the first mode, a reversible two-phase refrigeration system transfers heat to a battery pack thermal system and absorbs heat from a power electronics thermal system. In the second mode, the reversible two-phase refrigeration system absorbs heat from the battery pack thermal system without transferring heat from the power electronics thermal system to the battery pack thermal system. The reversible two-phase refrigeration system, the battery pack thermal system, and the power electronics thermal system are part of the heat pump thermal system. In the example of FIG. 3, a cold ambient condition exists and the heat pump vehicle thermal system 10 operates in the first mode. In the example of FIG. 4, a hot ambient condition exists and the heat pump vehicle thermal system 10 operates in the second mode.

Figure 8:
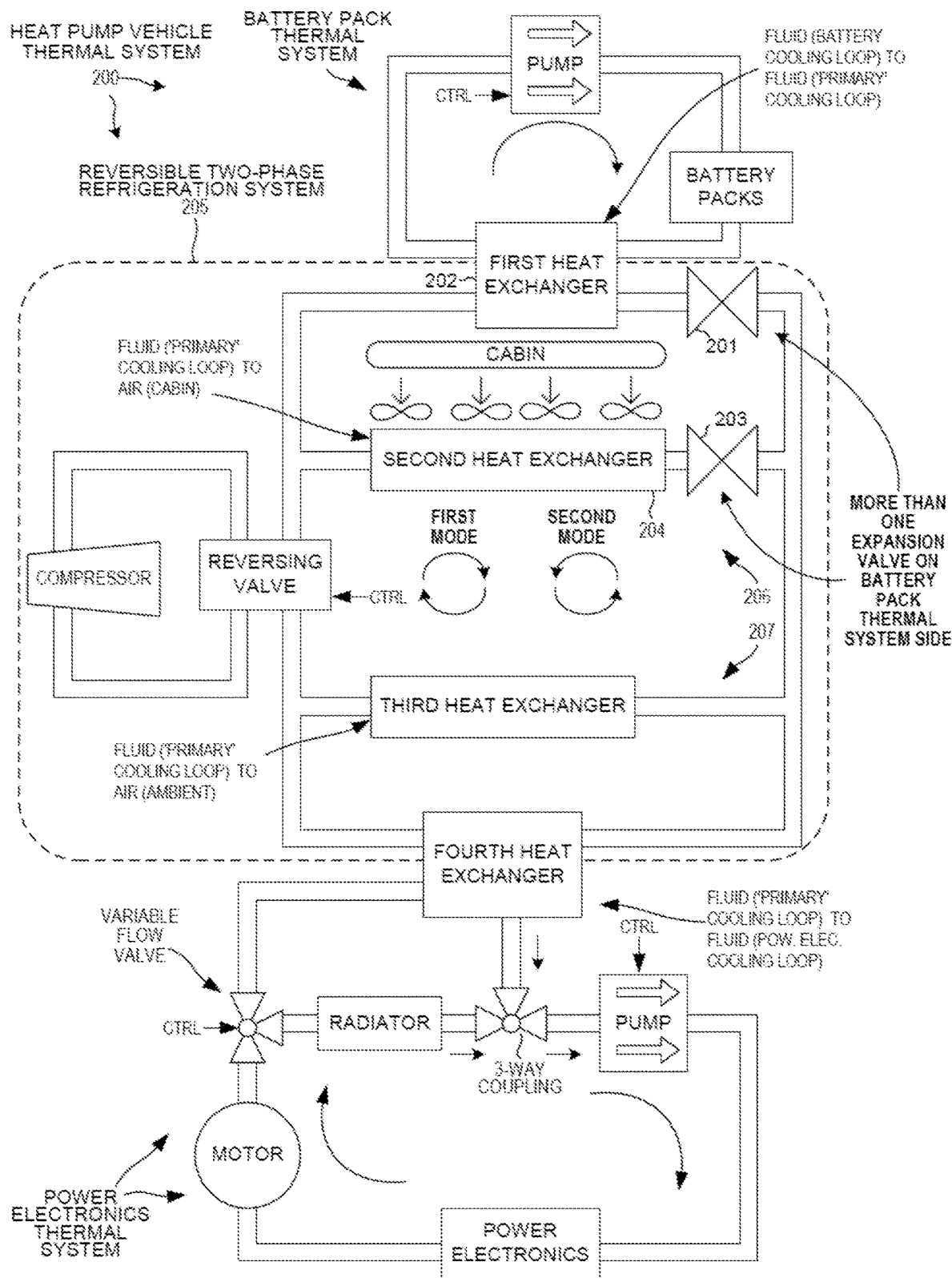
FIG. 8 is a diagram of another embodiment of a heat pump vehicle thermal system 200 having multiple expansion valves.

FIG. 8 is a diagram of another embodiment of a heat pump vehicle thermal system 200 having multiple expansion valves. A first expansion valve 201 is coupled to a first heat exchanger 202. A second expansion valve 203 is coupled to a second heat exchanger 204. The heat pump vehicle thermal system 200 has more than one expansion valve on an energy source side 206 of a reversible two-phase refrigeration system 205. The energy source side 206 of the reversible two-phase refrigeration system 205 is opposite a power electronics side 207 of the reversible two-phase refrigeration system 205. The heat pump vehicle thermal system 200 operates in a similar fashion as heat pump vehicle thermal system 10 of FIG. 2.

Figure 9:
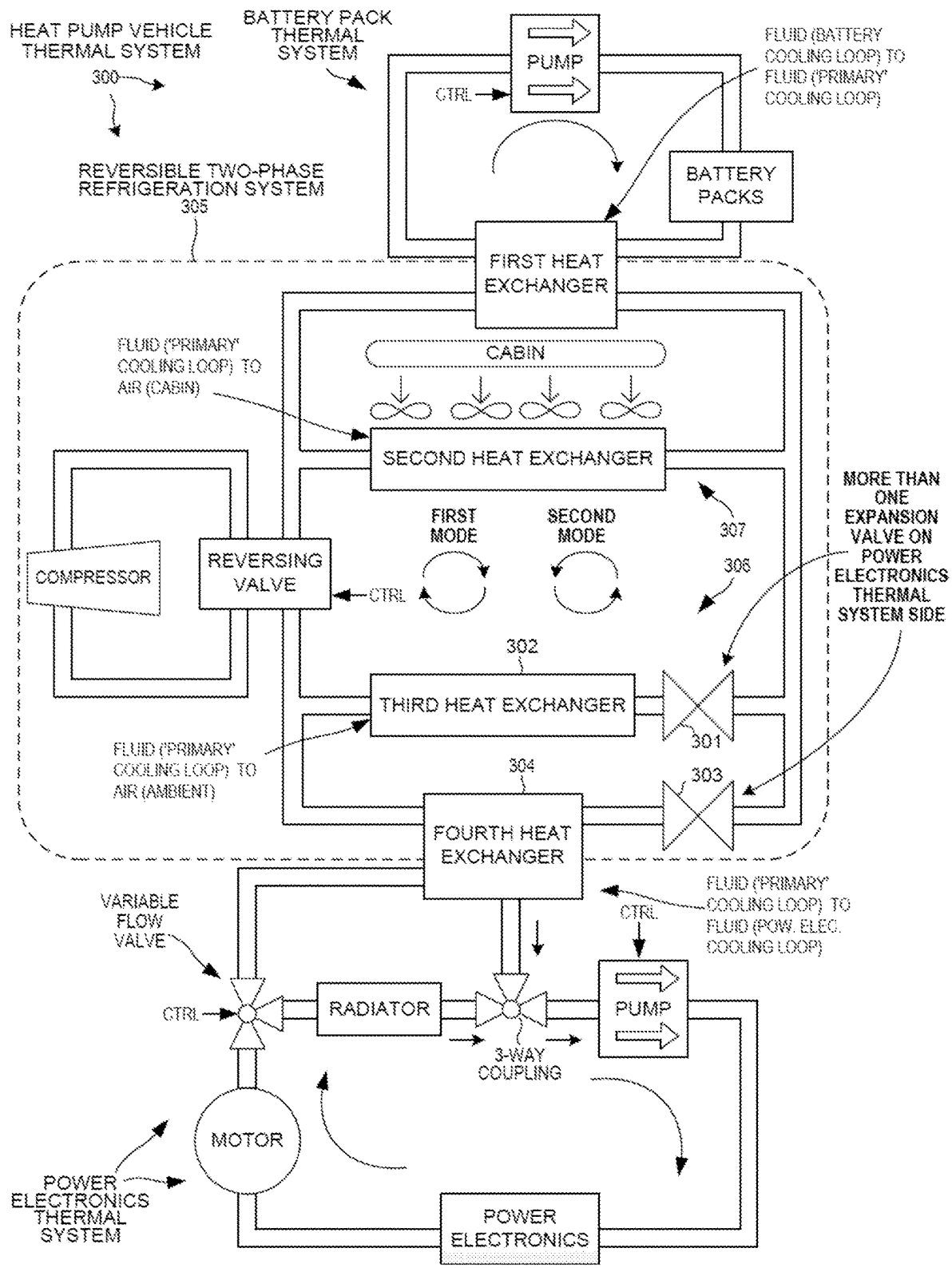
FIG. 9 is a diagram of yet another embodiment of a heat pump vehicle thermal system 300 having multiple expansion valves.

FIG. 9 is a diagram of yet another embodiment of a heat pump vehicle thermal system 300 having multiple expansion valves. A first expansion valve 301 is coupled to a third heat exchanger 302. A second expansion valve 303 is coupled to a fourth heat exchanger 304. The heat pump vehicle thermal system 300 has more than one expansion valve on a power electronics side 306 of a reversible two-phase refrigeration system 305. The power electronics side 306 of the reversible two-phase refrigeration system 305 is opposite an energy source side 307 of the reversible two-phase refrigeration system 305. The heat pump vehicle thermal system 300 operates in a similar fashion as heat pump vehicle thermal system 10 of FIG. 2.

Figure 10:
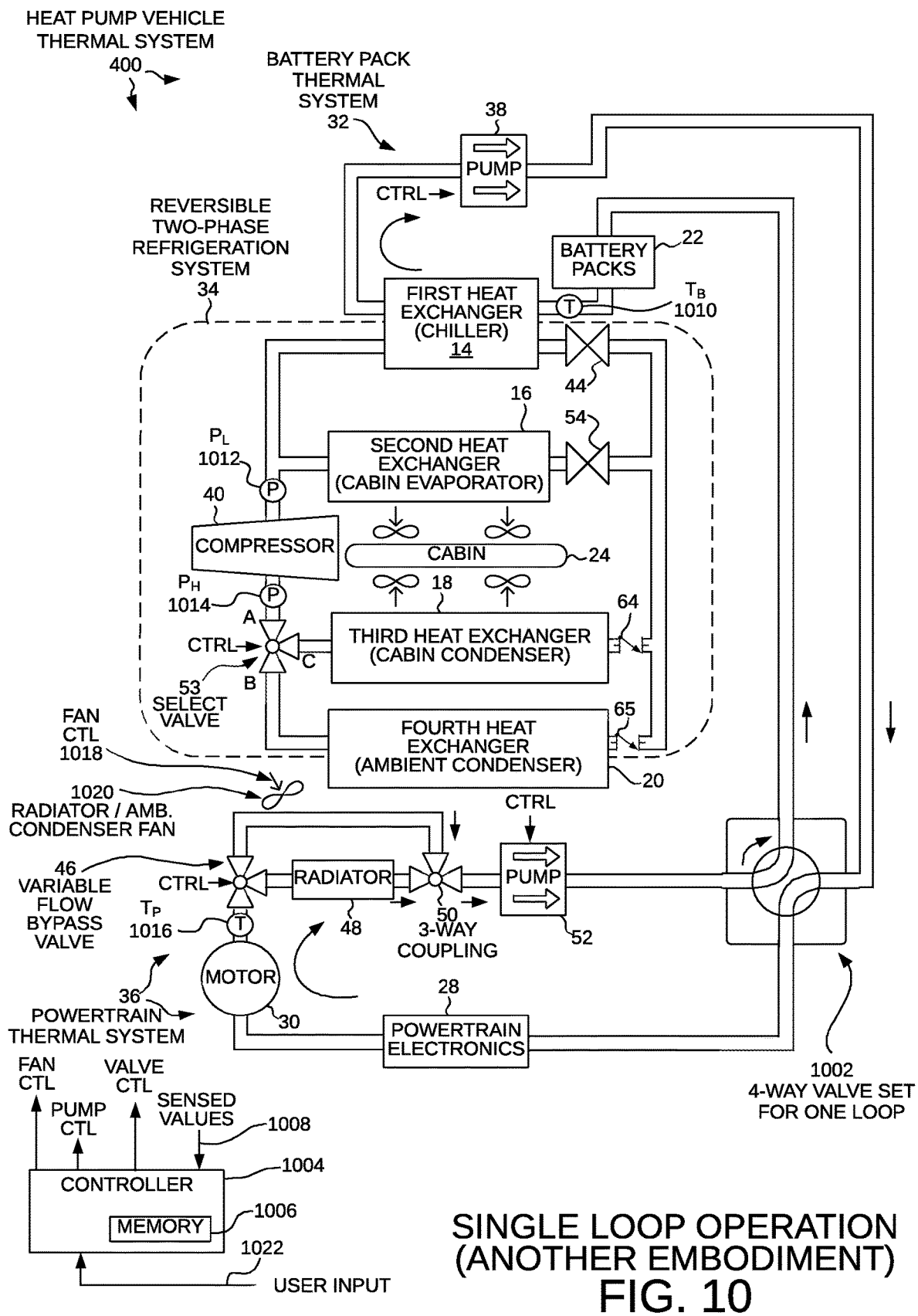
FIG. 10 is a diagram of yet another embodiment of a heat pump vehicle thermal system having a four-way valve set for single-loop operation.

FIG. 10 is a diagram of yet another embodiment of a heat pump vehicle thermal system 400 having a four-way valve 1002 set for single-loop mode in which the coolant operates in a single loop. The coolant may be water, Water-Ethylene-Glycol (WEG), or other liquid coolant. In this configuration, the first heat exchanger (chiller) 14 and the second heat exchanger (cabin evaporator) 16 can be enabled to add heat to the refrigerant from the battery pack thermal system 32 and cabin 24, respectively. The third heat exchanger (cabin condenser) 18 and the fourth heat exchanger (ambient condenser) 20 can be enabled to remove heat from the refrigerant and move it into the cabin 24 or the ambient 26, respectively. The cabin evaporator 16 and the cabin condenser 18 can be enabled at the same time to provide a dehumidifying mode in which humidity is removed from the air in the cabin 24. In a heat mode, the chiller 14 and cabin condenser 18 are turned on to provide heat derived from operation of the compressor 40 and transferred from the battery pack thermal system to the cabin 24.

In one embodiment, the heat pump vehicle thermal system 400 comprises a controller 1004 that includes a memory 1006. The controller comprises one or more of a processor, CPU, state machine, internal memory, program instructions, input/output interfaces, and other hardware/software used to perform the functions described herein. During operation, the controller 1004 is configured to receive user input 1022, such as heating/cooling requests, and output fan control signals (FAN CTL), pump control signals, compressor control signals (collectively, PUMP CTL), and valve control signals (VALVE CTL) that are used to control the various fans, pumps, compressors, and valves of the heat pump vehicle thermal system 400 to implement the various operating modes described herein. Valves include variable flow valves, such as the variable flow bypass valve 46, check valves, such as the one-way valves 64 and 65 coupled to the third and fourth heat exchangers, respectively, and select valves, such as the 4-way valve 1002, condenser select valve 53 and the expansion valves 44 and 54 coupled to the first and second heat exchangers, respectively. In an alternative embodiment, the expansion valve 44 and/or the expansion valve 54 are variable flow valves. In another alternate embodiment, one expansion valve is used for both the first and second heat exchangers, such as shown in FIG. 2 and separate valves turn the first and the second heat exchangers on or off. The fan control 1018 is part of the FAN CTL signals and is used to control a condenser fan 1020. The controller 1004 also receives sensed values 1008 from a variety of sensors, such as battery temperature ($T_B$) sensor 1010, compressor low side pressure ($P_L$) sensor 1012, compressor high side pressure ($P_H$) sensor 1014, and powertrain temperature ($T_P$) sensor 1016 that are used by the heat pump vehicle thermal system 400. An exemplary but not exhaustive list of sensed values are provided in a table shown in FIG. 19A. In one embodiment, the battery temperature sensor 1010 senses the temperature of a coolant used to move heat from a battery. In an alternative embodiment, the battery temperature sensor 1010 senses the temperature of a battery cell or aggregates the temperatures of two or more battery cells. In one embodiment, the powertrain temperature sensor 1016 senses the temperature of a coolant used to move heat from a motor or a power switch. In an alternative embodiment, the powertrain temperature sensor 1016 senses the temperature of a motor or power switch, or reports a value corresponding to an aggregated temperature measurement from one or more motors or one or more power switches or both. The memory 1006 stores a variety of predefined values that can be read by the controller 1004 and used, either individually or in combination with sensed/stored values, to set the various fan, pump, and valve control signals. An exemplary but not exhaustive list of stored values are provided in a table shown in FIG. 19B. Some of the stored values are not changed after being set initially. At least one stored value, a state variable (SP), and the control signal outputs are updated over time as the system runs.

Figure 11:
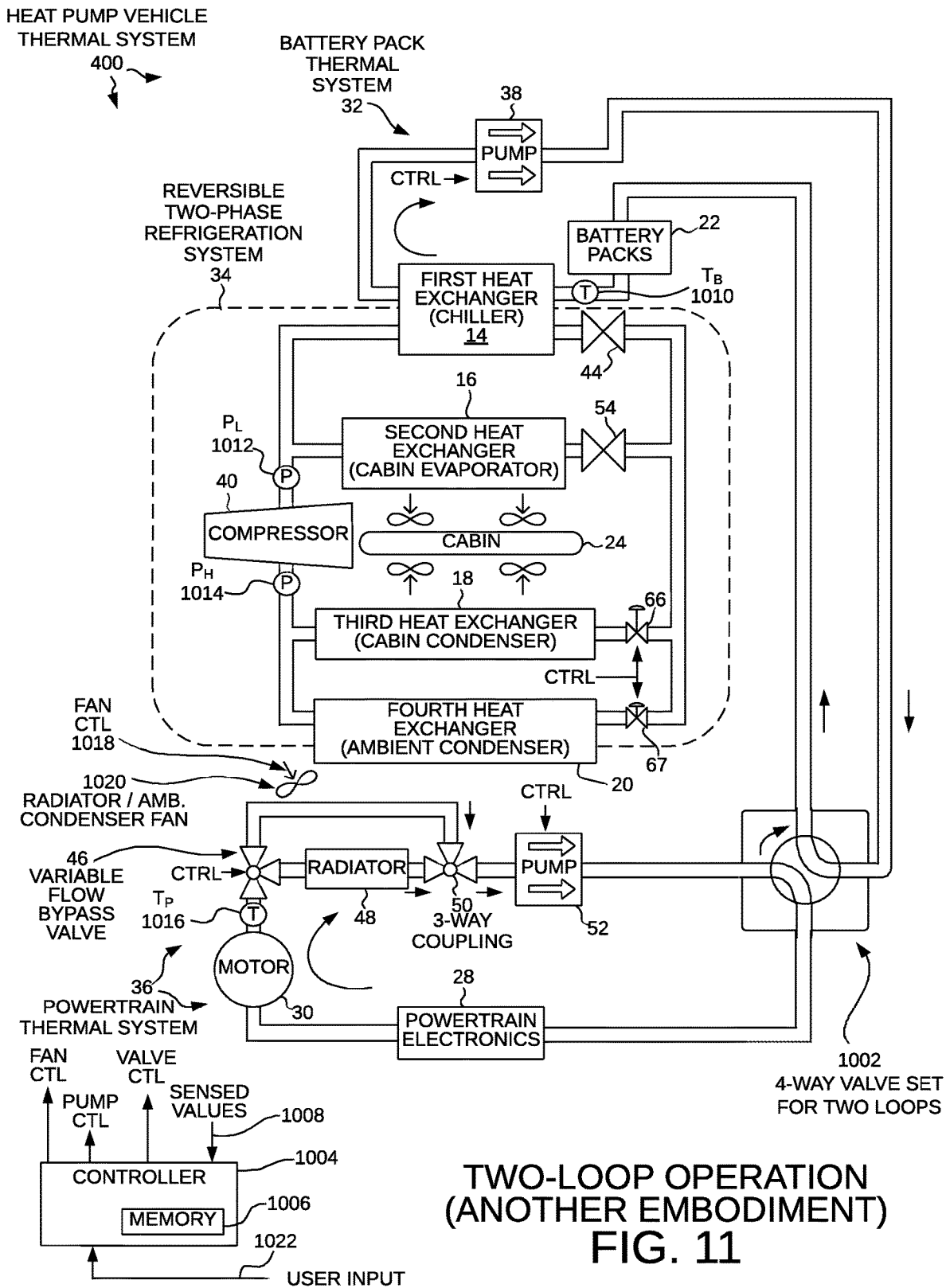
FIG. 11 is a diagram of yet another embodiment of a heat pump vehicle thermal system having a four-way valve set for two-loop operation.

FIG. 11 is a diagram of yet another embodiment of the heat pump vehicle thermal system 400 having a four-way valve 1002 set for dual-loop mode in which the two coolant loops operate separately. It should be noted that the select valve 53 shown in FIG. 10 can be implemented as a 3-2 valve or as two shut-off valves located on the compressor side of the condensers 18 and 20 or on the output side of the condensers 18 and 20. In the example shown in FIG. 11, shut-off valves 66 (Normally Open) and 67 (Normally Closed) are located on the output of the condensers 18 and 20, which allows for the use of smaller valves since the refrigerant has condensed as it flows out of the condenser. The valves 66 and 67 are controlled by operation of the controller 1004 to output a valve control signal which opens one shut-off valve at a time.

In an alternative embodiment, there are not check valves coupled to the condensers preventing refrigerant from flowing back and pooling in the unused condenser, but instead the system may cause refrigerant to flow through the unused condenser for a short time period to flush out any refrigerant and/or oil which has pooled in the unused condenser.

In various embodiments, the four-way valve 1002 is set to provide at least the following operating modes for the heat pump vehicle thermal system 400.

Dual-Loop Mode

Set 4-way valve 1002 to split the coolant into two coolant loops 32 and 36. Set select value to enable ambient condenser 20, set the variable flow bypass valve 46 for no radiator bypass, enable cabin evaporator 16 if cooling of the cabin is desired and then make the following adjustments.

1. Increase/decrease on-time of chiller 14, compressor 40 speed, pump 38 speed and/or condenser fan 1020 speed to maintain a temperature within the battery pack thermal system 32 within a desired range.
2. Increase/decrease radiator fan 1020 speed and/or coolant pump 52 speed to maintain a temperature of the powertrain cooling system 36 within a desired range.
3. Increase/decrease compressor 40 speed and/or on-time of the cabin evaporator 16 to provide more/less cooling to the passenger cabin 24.
4. If the temperature of the powertrain cooling system 32 is below a certain threshold, $T_D^{TH}$, switch into single-loop mode and set MODE value (SP=1); otherwise, return to (1).

Single-Loop Mode

Set four-way valve 1002 to combine the battery pack thermal system 32 with the powertrain thermal system 36 into a single coolant loop, then:

1. If defog or cabin A/C is requested, turn cabin evaporator 16 on.
2. Select between condensers 18 and 20 to ensure the driver's heat request is met and not overshot (i.e. use ambient condenser 20 only to prevent the driver from getting too hot).
3. Increase/decrease a temperature of the single coolant loop by increasing/decreasing flow bypassing radiator 48, by adjusting the coolant pumps' 38 and 52 speeds, by turning the chiller 14 on and off, by adjusting the compressor 40 speed, and by adjusting the radiator fan 1020 speed.
4. If the temperature of the single coolant loop is above a certain threshold, $T_S^{TH}$, switch into Dual-loop Mode and set SP=2; otherwise, return to (1).

Figure 12:
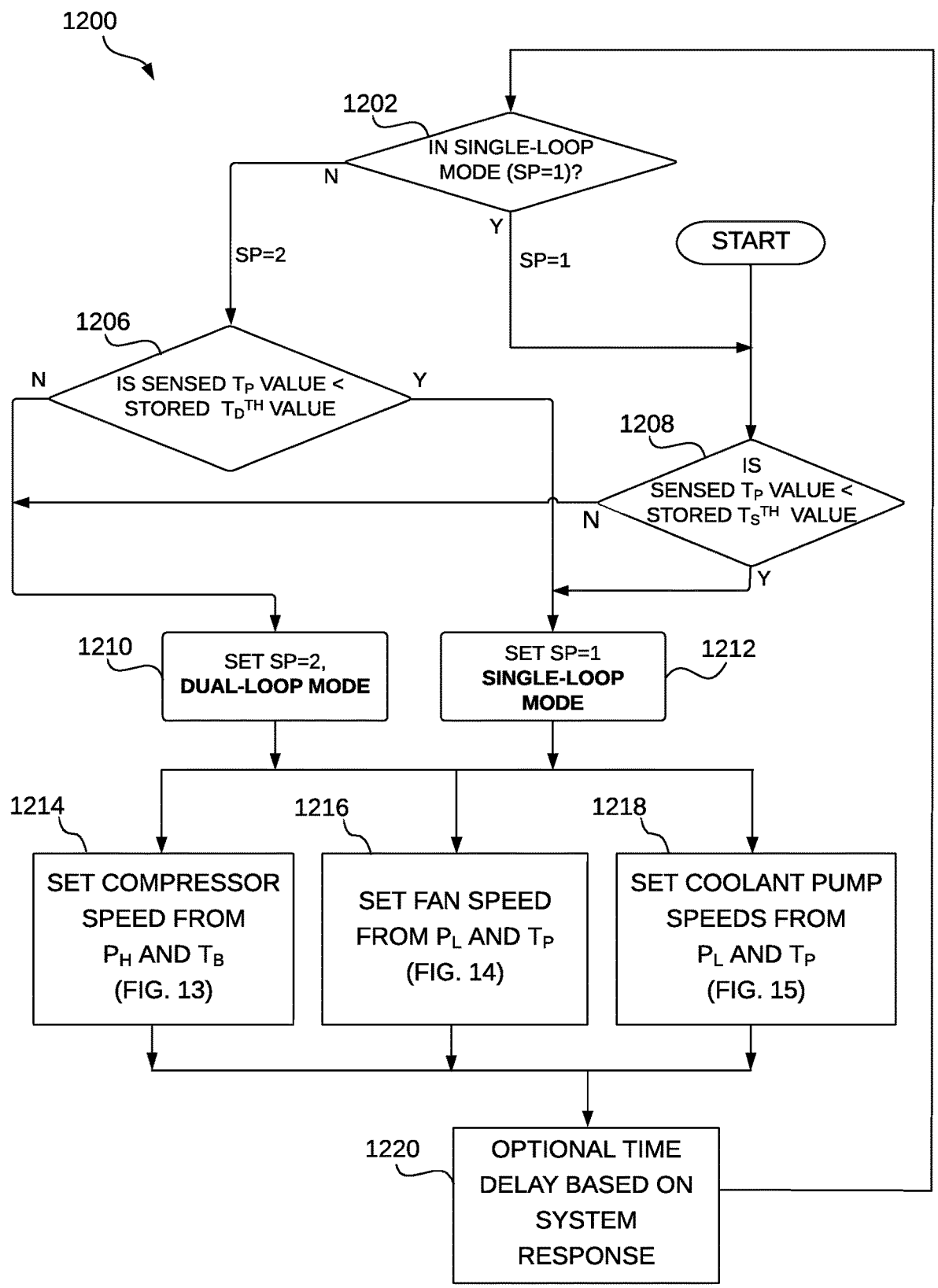
FIG. 12 shows control functions for setting compressor speed, fan speed, and WEG pump speeds.

FIG. 12 shows control functions 1200 for setting compressor speed, fan speed, and coolant pump speeds. In various embodiments, a state variable (SP) is utilized that can have one of two values. When SP=1, the system is in a single-loop operating mode, and when SP=2, the system is in a dual-loop operating mode.

At block 1202, a determination is made as to whether the system is in the single-loop operating mode (SP=1). If SP=1, the method proceeds to block 1208. If SP=2, the method proceeds to block 1206. When the method initially starts, it begins at block 1208.

At block 1206, a determination is made as to whether a sensed powertrain temperature ($T_P$) value is less than (<) a stored value of $T_D^{TH}$. If $T_P$ is less than $T_D^{TH}$, the method proceeds to block 1212. If $T_P$ is not less than $T_D^{TH}$, the method proceeds to block 1210.

At block 1208, a determination is made as to whether a sensed powertrain temperature ($T_P$) value is less than (<) a stored value $T_D^{TH}$. If $T_P$ is less than $T_D^{TH}$, the method proceeds to block 1212. If $T_P$ is not less than $T_D^{TH}$, the method proceeds to block 1210.

At block 1210, the SP variable is set to (SP=2) to indicate that the system is to operate in the dual-loop mode. The 4-way valve 1002 is set to keep the two coolant loops circulating separately, each powered by its own pump 38 or 52, respectively.

At block 1212, the SP variable is set to (SP=1) to indicate that the system is to operate in the single-loop mode. The 4-way valve 1002 is set to connect a single coolant loop which includes both pumps 38 and 52.

At block 1214, a compressor speed is set based on high side pressure $P_H$ and battery temperature $T_B$ values. A more detailed description of the control functions at block 1214 are provided in FIG. 13.

At block 1216, a fan speed is set based on the obtained low side pressure $P_L$ and powertrain temperature $T_P$ values. A more detailed description of the control functions at block 1216 are provided in FIG. 14.

At block 1218, speeds of WEG pumps are set based on the obtained low side pressure $P_L$ and powertrain temperature $T_P$ values. A more detailed description of the control functions at block 1218 are provided in FIG. 15.

At block 1220, an optional time delay is incurred. In one embodiment, the time delay is determined based on a thermal response of the system. In one embodiment, the time delay is in the range of 0.1 seconds to 60 seconds. The time delay provides time for the thermal system to respond to the control actions taken in the prior steps and for the temperatures and pressures to change before the method proceeds to block 1202 and the temperatures and pressures are sensed again. After the time delay has completed, the method proceeds to block 1202.

Figure 13:
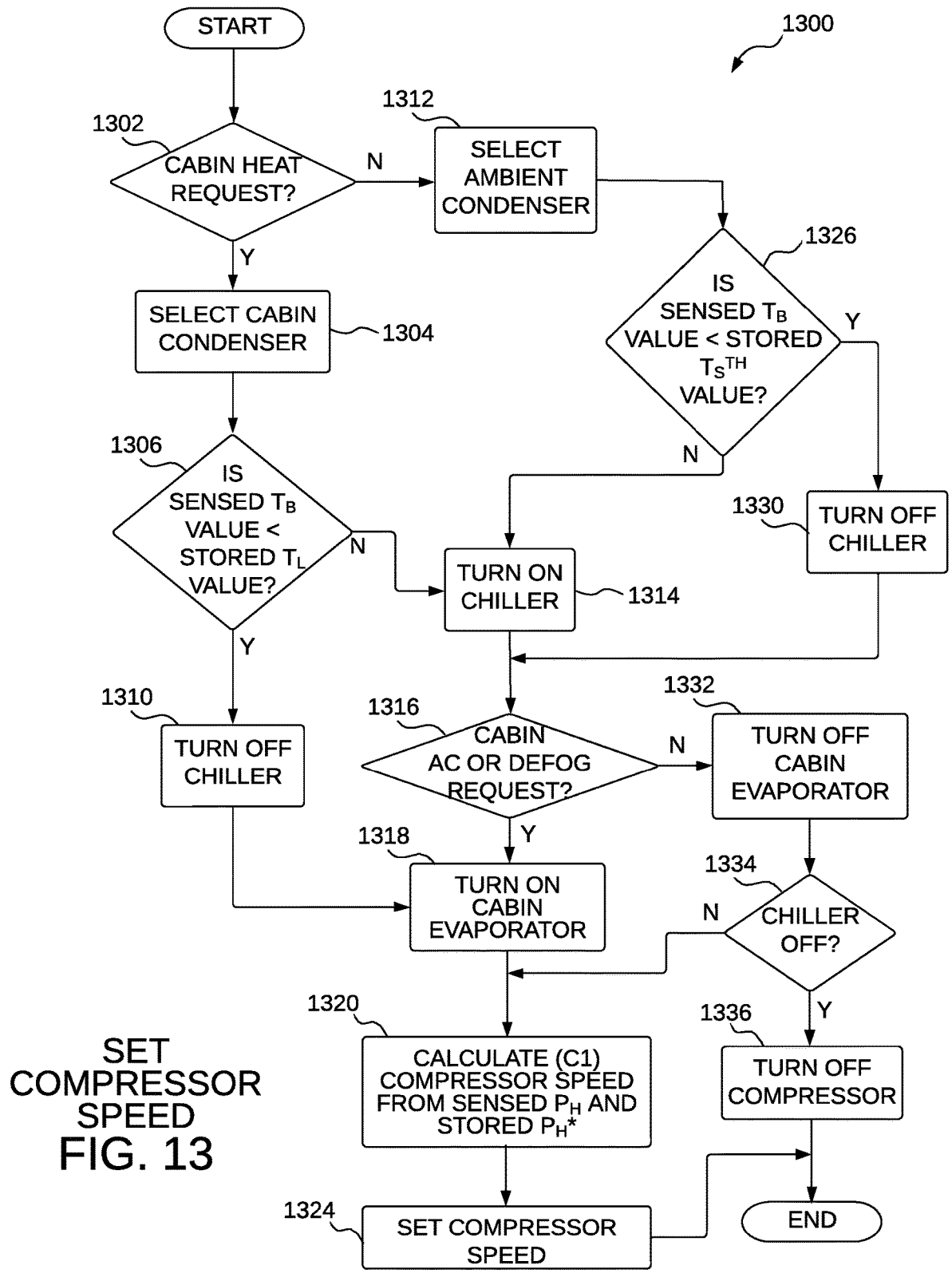
FIG. 13 shows a method for setting compressor speed.

FIG. 13 shows a method 1300 for setting a compressor speed. In one embodiment, method 1300 is suitable for use to perform the control functions at block 1214 shown in FIG. 12.

At block 1302, a determination is made as to whether a cabin heat request has been received. If a cabin heat request has been received, the method proceeds to block 1304. If a cabin heat request has not been received, the method proceeds to block 1312.

At block 1304, the cabin condenser 18 is selected by the select valve 53.

At block 1306, a determination is made as to whether a sensed battery temperature $T_B$ value is less than a stored low side temperature $T_L^*$ value. If $T_B$ is less than $T_L^*$, the method proceeds to block 1310. If $T_B$ is not less than $T_L^*$, the method proceeds to block 1314.

At block 1310, the chiller 14 is turned off. In one embodiment, the chiller 14 is turned off by closing the expansion valve 44. Then, the method proceeds to block 1318.

At block 1312, the ambient condenser 20 is selected by the select valve 53.

At block 1314, the chiller 14 is turned on. In one embodiment, the chiller 14 is turned on by opening the expansion valve 44.

At block 1316, a determination is made as to whether a cabin AC or defrost request has been received. If a cabin AC or defrost request has not been received, the method proceeds to block 1332. If a cabin AC or defrost request has been received, the method proceeds to block 1318.

At block 1318, the cabin evaporator 16 is turned on. In one embodiment, the cabin evaporator is turned on by opening the expansion valve 54.

At block 1320, a compressor speed is calculated. In one embodiment, the compressor speed is calculated using calculation block (C1) shown in FIG. 17. For example, as shown in block C1, a summation block 1706 subtracts a stored parameter ($P_H^*$) from a sensed parameter ($P_H$) to produce a difference value that is input to a proportional integral derivative (PID) controller 1708 that computes a calculated value, which in this case is a compressor speed.

At block 1324, the compressor speed is set to the value calculated at block 1320.

At block 1326, a determination is made as to whether a sensed battery temperature $T_B$ value is less than a stored high side temperature $T_S^{TH}$ value. If $T_B$ is less than $T_S^{TH}$, the method proceeds to block 1330. If $T_B$ is not less than $T_B$, the method proceeds to block 1314.

At block 1330, the chiller 14 is turned off. In one embodiment, the chiller 14 is turned off by closing the expansion valve 44.

At block 1332, the cabin evaporator 16 is turned off. In one embodiment, the cabin evaporator 16 is turned off by closing the expansion valve 54.

At block 1334, a determination is made as to whether the chiller 14 is turned off. If the chiller 14 is not turned off, the method proceeds to block 1320. If the chiller 14 is turned off, the method proceeds to block 1336.

At block 1336, the compressor 40 is turned off and the method ends.

Thus, the method 1300 operates to set a compressor speed. It should be noted that the operations of method 1300 are exemplary and not limiting and that the operations may be added to, deleted, rearranged, or otherwise modified within the scope of the embodiments.

Figure 14:
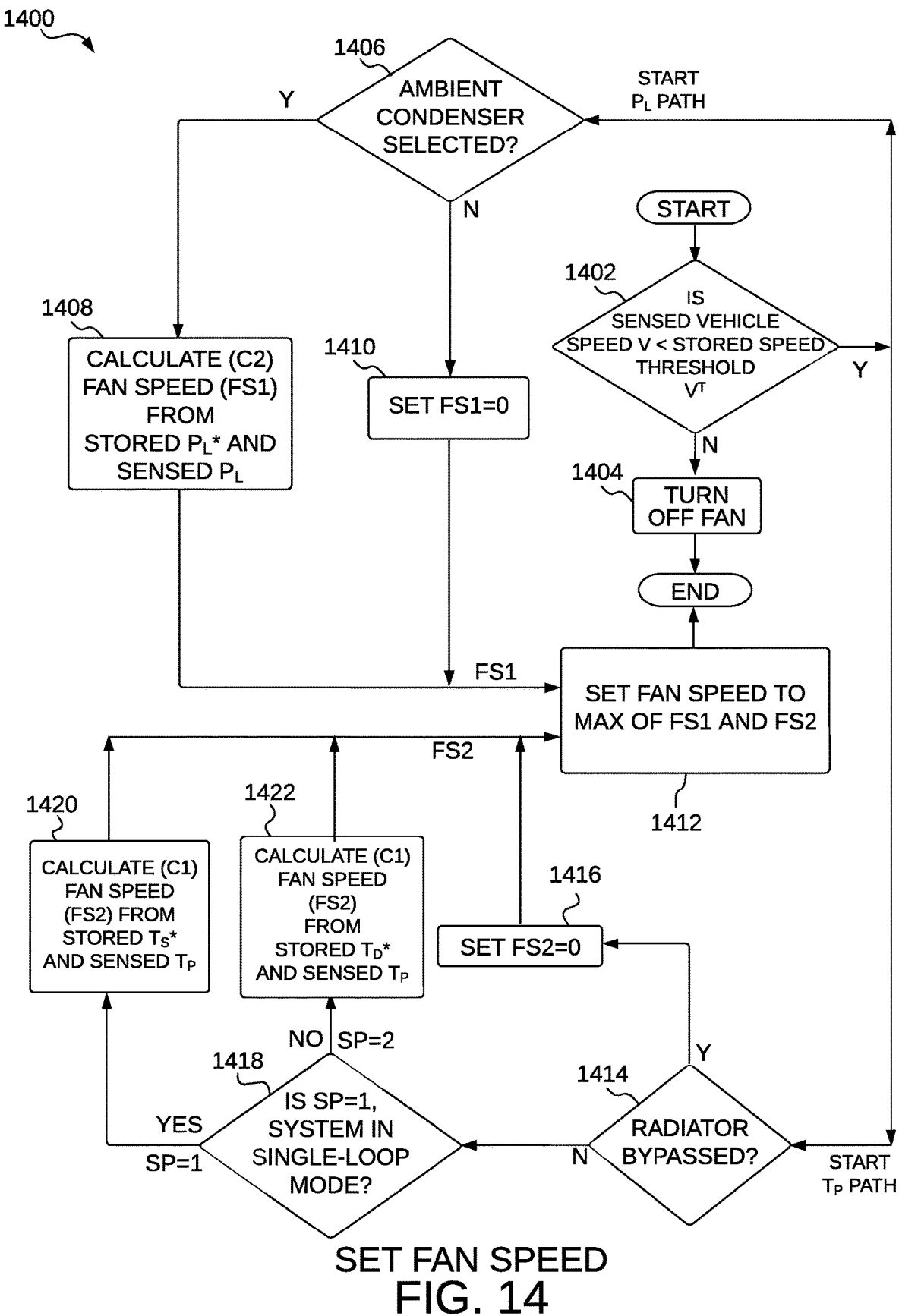
FIG. 14 shows a method for setting fan speed.

FIG. 14 shows a method 1400 for performing a control function to set a fan speed. The method 1400 is suitable for use to implement block 1216 shown in FIG. 12.

At block 1402, a comparison is made to determine if a sensed vehicle speed, V, is less than a stored speed threshold, $V^T$. If V is less than $V^T$ ($V<V^T$), the method proceeds to start the parallel paths at block 1406 and block 1414. If V is not less than $V^T$, the method proceeds to block 1404.

In one embodiment, the method 1400 provides two parallel paths. A first path is referred to as a low pressure $P_L$ path that begins at block 1406. A second path is referred to as a powertrain temperature $T_P$ path that begins at block 1414. The first path operates to produce a fan speed value of zero (0) or FS1 to a maximum detector block 1412. The second path operates in parallel with the first path to produce a fan speed of zero (0) or FS2 to the maximum detector block 1412.

At block 1404, the fan is turned off and the method ends.

At block 1406, the $P_L$ path starts and a determination is made as to whether the ambient condenser 20 has been selected. If the ambient condenser 20 has been selected by operation of the select valve, the method proceeds to block 1408. If the ambient condenser 20 has not been selected, the method proceeds to block 1410.

At block 1408, a fan speed (FS1) is calculated. In one embodiment, the fan speed (FS1) is calculated using calculation block (C2) shown in FIG. 17. For example, as shown in block C2, a summation block 1710 subtracts a sensed parameter ($P_L$) from a stored parameter ($P_L$*) to produce a difference value that is input to a proportional integral derivative (PID) controller 1712 that computes a calculated value, which in this case is fan speed (FS1). The calculated fan speed (FS1) is input to block 1412.

At block 1410, the fan speed FS1 is set to zero.

At block 1412, a maximum fan speed is determined from all the inputs to block 1412. For instance, the $P_L$ path contributes a fan speed FS1 that is either 0 or a fan speed calculated from $P_L$* and $P_L$.

As is described in detail below, the $T_P$ path contributes a fan speed FS2 that is either 0 or a fan speed calculated from ($T_S$* and $T_P$) or ($T_D$* and $T_P$). The maximum fan speed received at block 1412 upon the conclusion of execution of both of the parallel paths in this method 1400 is used to set the fan speed. The method 1400 then ends.

At block 1414, a determination is made as to whether the radiator 48 is bypassed. If the radiator 48 is bypassed, the method proceeds to block 1416. If the radiator 48 is not bypassed, the method proceeds to block 1418.

At block 1416, the fan speed FS2 is set to zero.

At block 1418, a determination is made as to whether the system is operating in single-loop mode (SP=1). For instance, the operating mode of the system is set in blocks 1210 and 1212 of the method 1200 shown in FIG. 12. If the system is operating in single-loop mode, the method proceeds to block 1420 and ($T_P < T_D^{TH}$). If the system is not operating in single-loop mode, the method proceeds to block 1422 and ($T_P >= T_S^{TH}$).

At block 1420, a fan speed (FS2) is calculated from a stored $T_S$* parameter and a sensed $T_P$. In one embodiment, the fan speed (FS2) is calculated using calculation block (C1) shown in FIG. 17. For example, as shown in block C1, a summation block 1706 subtracts a stored parameter ($T_S$*) from a sensed parameter ($T_P$) to produce a difference value that is input to a proportional integral derivative (PID) controller 1708 that computes a calculated value, which in this case is fan speed (FS2). The calculated fan speed (FS2) is input to block 1412.

At block 1422, a fan speed (FS2) is calculated from a stored $T_D$* and a sensed $T_P$. In one embodiment, the fan speed (FS2) is calculated using calculation block (C1) shown in FIG. 17. For example, as shown in block C1, a summation block 1706 subtracts a stored parameter ($T_D$*) from a sensed parameter ($T_P$) to produce a difference value that is input to a proportional integral derivative (PID) controller 1708 that computes a calculated value, which in this case is fan speed (FS2). The calculated fan speed (FS2) is input to block 1412.

It should be noted that the operations of method 1400 are exemplary and not limiting and that the operations may be added to, deleted, rearranged, or otherwise modified within the scope of the embodiments.

Figure 15:
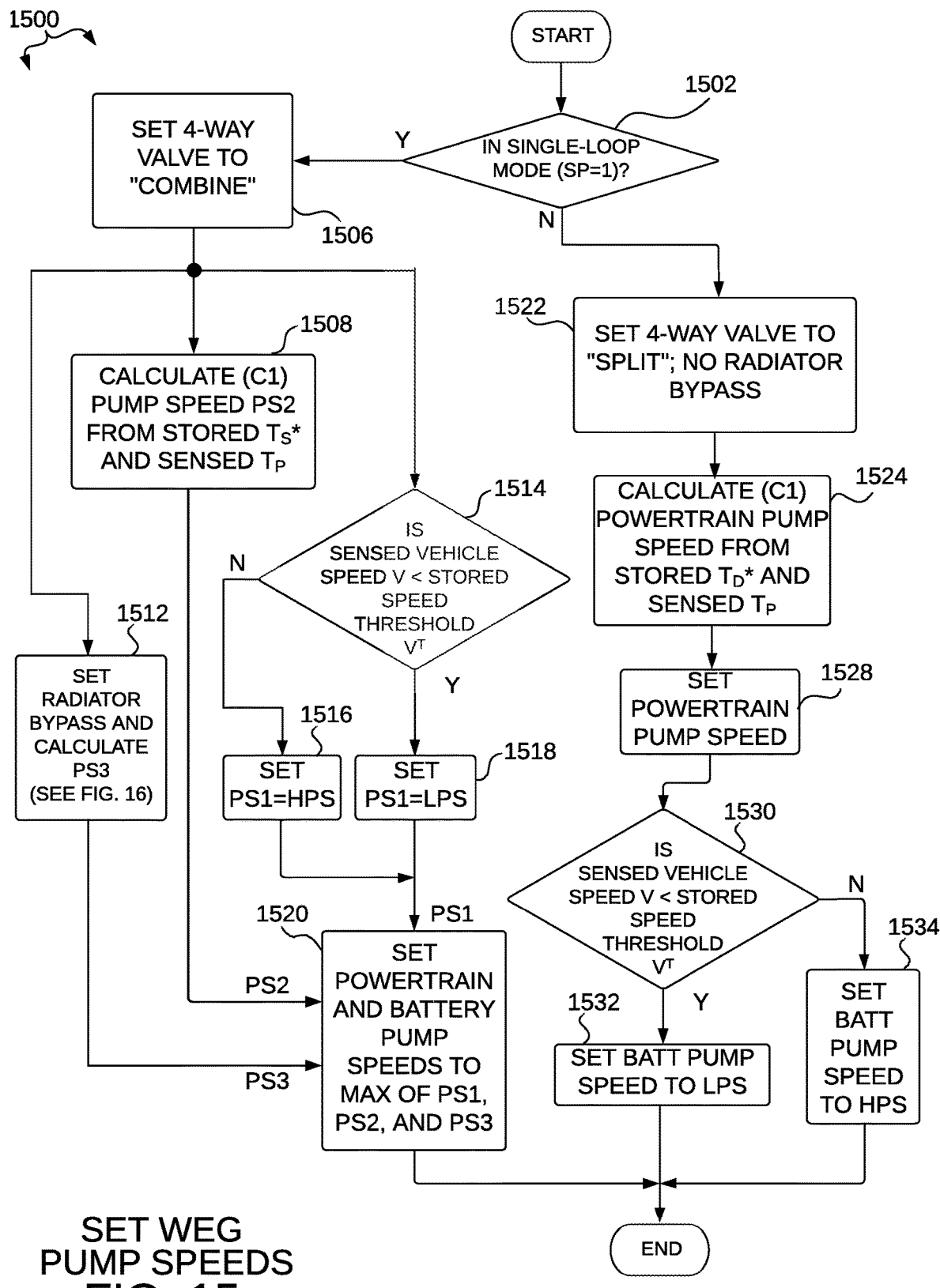
FIG. 15 shows a method for setting WEG pump speeds.

FIG. 15 shows a method 1500 for setting coolant pump speeds. The method 1500 is suitable for use to implement block 1218 shown in FIG. 12.

At block 1502, a determination is made as to whether the system is set to operate in the single-loop mode (SP=1). If SP=1, the method proceeds to block 1506. If SP is not equal to 1, then SP=2 and the method proceeds to block 1522.

At block 1506, a four-way valve 1002 is set to a "combine" position such that a single coolant loop is formed.

At block 1508, a pump speed (PS2) is calculated from a stored $T_S$* parameter and a sensed $T_P$. In one embodiment, the pump speed (PS2) is calculated using calculation block (C1) shown in FIG. 17. For example, as shown in block C1, a summation block 1706 subtracts a stored parameter ($T_S$*) from a sensed parameter ($T_P$) to produce a difference value that is input to a proportional integral derivative (PID) controller 1708 that computes a calculated value, which in this case is pump speed (PS2). The calculated pump speed (PS2) is input to block 1520.

Figure 16:
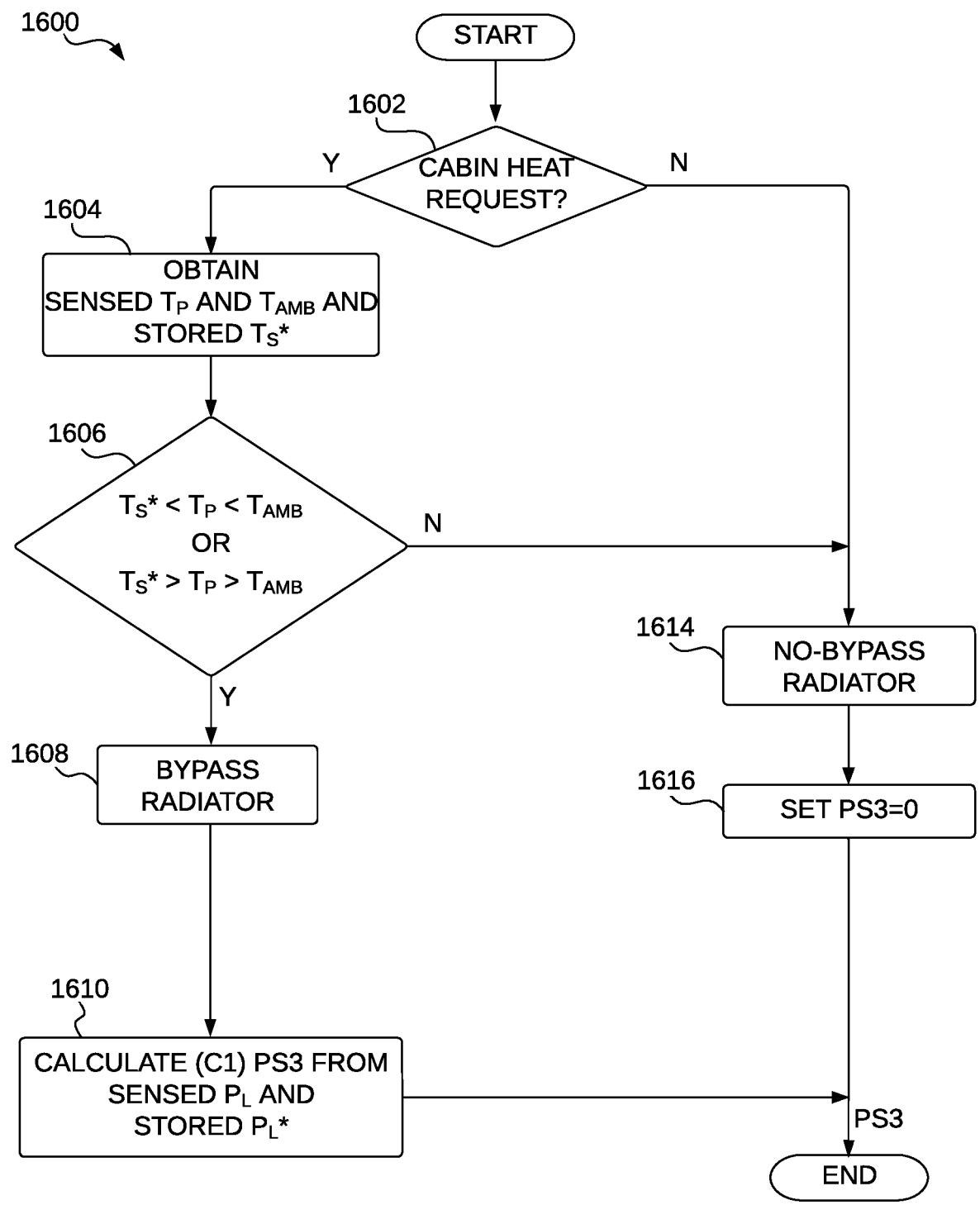
FIG. 16 shows a method for determining a radiator bypass state.

At block 1512, a radiator bypass is set and a pump speed PS3 is calculated as illustrated in FIG. 16.

At block 1514, a comparison is performed to determine if a sensed vehicle speed (V) is less than a stored speed threshold ($V^T$). If V is less than $V^T$ ($V<V^T$), the method proceeds to block 1518. If V is not less than $V^T$, the method proceeds to block 1516.

At block 1516, a motor pump speed (PS1) value for the motor pump 52 is set to a high pump speed (HPS) value. In one embodiment, the HPS is set to operate the pump 52 at 28 liters per minute (LPM) for a 2-battery system and 36 LPM for a 3-battery system. The HPS may be preconfigured to be a flow rate that provides adequate coolant flow for the battery pack(s) to operate over their entire specified performance range during any vehicle driving.

At block 1518, a motor pump speed (PS1) value for the motor pump 52 is set to a low pump speed (LPS) value. In one embodiment, the LPS is set to operate the pump 52 at 6 LPM for a 2-battery system and 9 LPM for a 3-battery system. The LPS may be preconfigured to be a flow rate that provides adequate coolant flow for the battery pack(s) to operate at only a subset of their specified performance range, such as only at lower power levels.

At block 1520, speeds of a powertrain (motor) pump 52 and a battery pump 38 are set to the maximum pump speed that is received (e, g,. maximum of PS1, PS2, and PS3).

At block 1522, the four-way valve 1002 is set to a "split" position to form two coolant loops and the radiator 48 is not bypassed.

At block 1524, a pump speed is calculated from a stored $T_D$* parameter and a sensed $T_P$ parameter. In one embodiment, the pump speed is calculated using calculation block (C1) shown in FIG. 17. For example, as shown in block C1, a summation block 1706 subtracts a stored parameter ($T_D$*) from a sensed parameter ($T_P$) to produce a difference value that is input to a proportional integral derivative (PID) controller 1708 that computes a calculated value, which in this case is a powertrain pump speed. The calculated powertrain pump speed is input to block 1528.

At block 1528, a speed of the powertrain (motor) pump 52 is set to the calculated powertrain (motor) pump speed determined at block 1524.

At block 1530, a comparison is performed to determine if a sensed vehicle speed (V) is less than a stored speed threshold ($V^T$). If V is less than $V^T$ ($V<V^T$), the method proceeds to block 1532. If V is not less than $V^T$, the method proceeds to block 1534.

At block 1532, a pump speed value for the battery pump 38 is set to a stored low pump speed (LPS) value. In one embodiment, the LPS is set to operate the battery pump 38 at 6 LPM for a 2-battery system and 9 LPM for a 3-battery system.

At block 1534, a pump speed value for the battery pump 38 is set to a stored high pump speed (HPS) value. In one embodiment, the HPS is set to operate the pump 38 at 28 liters per minute (LPM) for a 2-battery system and 36 LPM for a 3-battery system.

It should be noted that the operations of method 1500 are exemplary and not limiting and that the operations may be added to, deleted, rearranged, or otherwise modified within the scope of the embodiments.

FIG. 16 shows a method 1600 for determining a radiator bypass state.

At block 1602, a determination is made as to whether a cabin heat request has been received. If a cabin heat request has been received, the method proceeds to block 1604 to try to use heat from the coolant for cabin heating. If a cabin heat request has not been received, the method proceeds to block 1614.

At block 1604, a sensed powertrain temperature $T_P$ and an ambient temperature $T_{AMB}$ are obtained. A stored powertrain temperature $T_S^*$ is also obtained which represents the maximum target temperature for the coolant system while the coolant system operates in single-loop mode (SP=1).

At block 1606, a determination is made as to whether the ambient temperature $T_{AMB}$ and powertrain temperature $T_P$ are within a first range ($T_S^*<T_P<T_{AMB}$) Or a second range ($T_S^*>T_P>T_{AMB}$). If $T_{AMB}$ and $T_P$ are within the first or second ranges, the method proceeds to block 1608, recognizing the ambient temperature is further away from $T_S^*$ than the powertrain temperature $T_P$ is from $T_S^*$, and as such, bypassing the radiator will help move $T_P$ towards $T_S^*$. If $T_P$ Or $T_{AMB}$ are not within the first or second ranges, the method proceeds to block 1614, recognizing that the ambient temperature is closer to $T_S^*$ than the powertrain temperature $T_P$ is to $T_S^*$.

At block 1608, the bypass valve 46 is set so that the coolant bypasses the radiator. For instance, if bypassing the radiator will move $T_P$ towards $T_S^*$, the bypass valve 46 is set so that the radiator 48 is bypassed. Valve 46 may be a variable flow valve to allow for partial radiator bypass, or valve 46 may be a 2-position valve that is either set to bypass or not bypass the radiator.

At block 1610, a pump speed (PS3) is calculated from a stored $P_L^*$ parameter and a sensed $P_L$ parameter. In one embodiment, the pump speed (PS3) is calculated using calculation block (C1) shown in FIG. 17. For example, as shown in block C1, a summation block 1706 subtracts a stored parameter ($P_L^*$) from a sensed parameter ($P_L$) to produce a difference value that is input to a proportional integral derivative (PID) controller 1708 that computes a calculated value, which in this case is pump speed (PS3). The calculated pump speed (PS3) is returned to the method 1500 and input to block 1520.

At block 1614, a valve is set so that the radiator is not bypassed. For instance, if the coolant gets too hot and the heat is not needed for the cabin, or if the coolant is cooler than ambient and using the radiator would increase the heat of the coolant towards $T_S^*$, the valve 46 is set so that the radiator 48 is not bypassed.

At block 1616, the third pump speed value (PS3) is set to zero. The pump speed of (PS3=0) is returned to the method 1500 and input to block 1520.

It should be noted that the operations of method 1600 are exemplary and not limiting and that the operations may be added to, deleted, rearranged, or otherwise modified within the scope of the embodiments.

Figure 17:
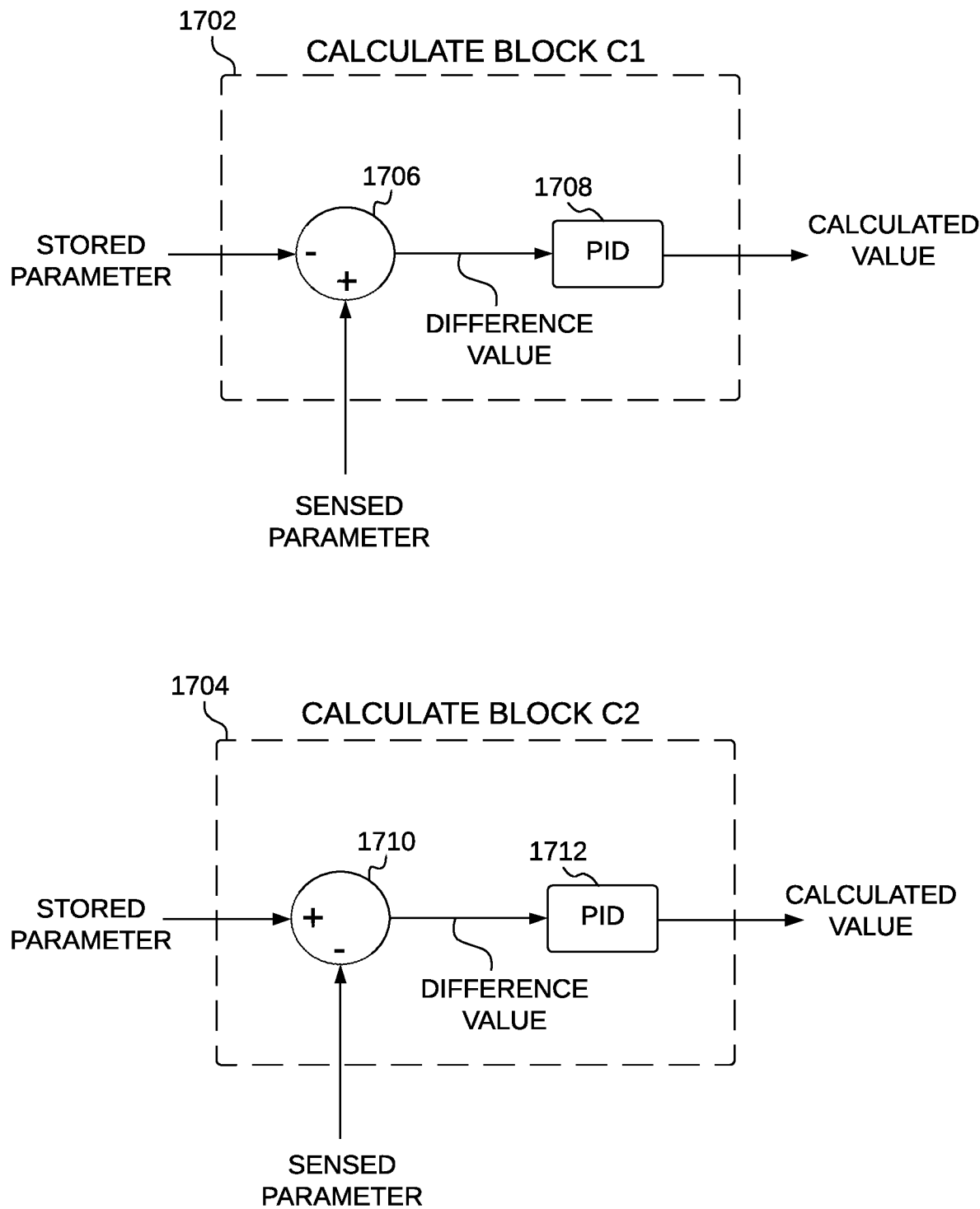
FIG. 17 shows exemplary calculation blocks.

FIG. 17 shows exemplary calculation blocks 1702 (C1) and 1704 (C2). In one embodiment, the calculation block 1702 (C1) comprises a summation block 1706 and a PID controller 1708. In block 1702, the summation block 1706 forms a difference value by subtracting a stored parameter from a sensed parameter. The difference value is input to the PID controller 1708. The PID controller 1708 determines a calculated value by calculating proportional, integral, and derivative responses and summing those three components to compute the calculated value. It should be noted that calculate block 1702 (C1) is used in several of the methods shown herein to process sensed and stored values to generate fan speeds or pump speeds. Alternative embodiments of calculation blocks may use a proportional integral (PI) controller instead of a PID controller, or may implement a floor or ceiling value on their output, or may implement other control strategies, such as feed-forward or state space or observer-based controls. Calculation block C1 is used in instances where the input and output vary directly; where increasing the control output of the calculate block causes the sensed value input into the control block to increase and vice-versa.

In one embodiment, the calculation block 1704 (C2) comprises a summation block 1710 and a PID controller 1712. In block 1704, the summation block 1710 forms a difference value by subtracting a sensed parameter from a stored parameter. The difference value is input to the PID controller 1712. The PID controller 1712 determines a calculated value by calculating proportional, integral, and derivative responses and summing those three components to compute the calculated value. It should be noted that calculate block 1704 (C2) is used at block 1408 in method 1400 shown in FIG. 14 to generate a fan speed.

Alternative embodiments of calculation blocks may use a proportional integral (PI) controller instead of a PID controller, or may implement a floor or ceiling value on their output, or may implement other control strategies, such as feed-forward or state space or observer-based controls. Calculation block C2 is used in instances where the input and output vary inversely; where increasing the control output of the calculate block causes the sensed value input into the control block to decrease and vice-versa.

FIG. 18 shows various control functions for use with a heat pump vehicle thermal system having a four-way valve.

FIG. 19A shows various sensed parameters for use with a heat pump vehicle thermal system having a four-way valve. In one embodiment, the sensed parameters shown in FIG. 19A represents the sensed values 1008 that are acquired by the controller 1004.

FIG. 19B shows various stored parameters for use with a heat pump vehicle thermal system having a four-way valve. In one embodiment, the stored parameters shown in FIG. 19B represents values stored in the memory 1006 that are accessed and utilized by the controller 1004.

Figure 20:
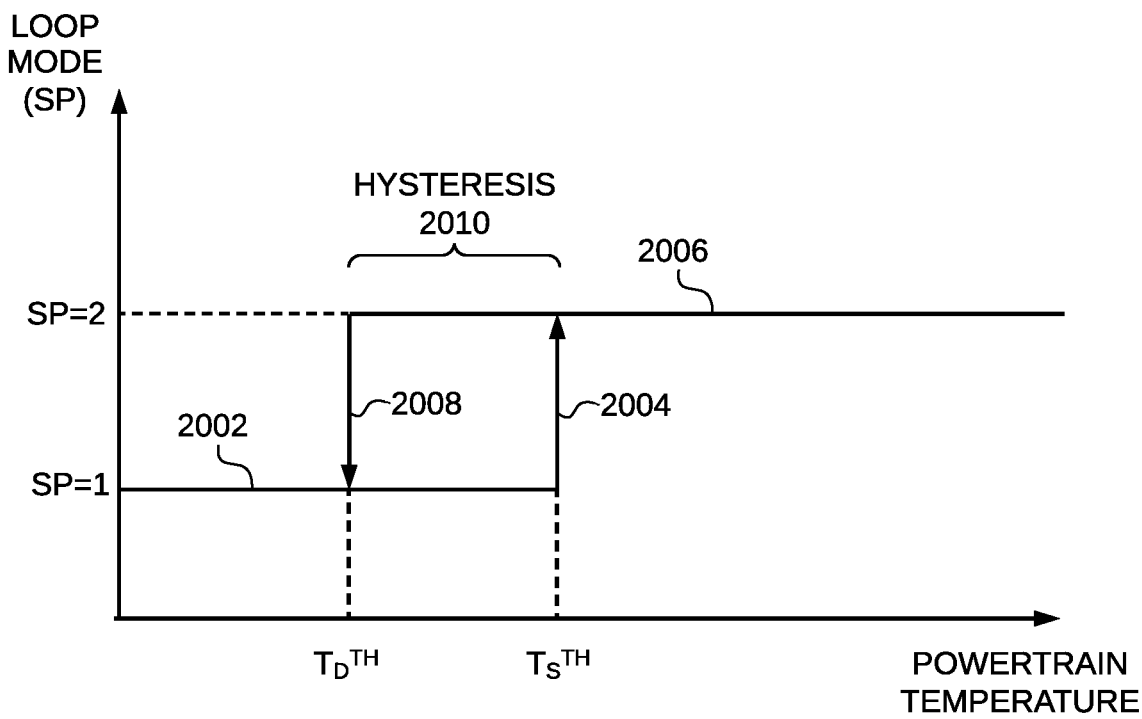
FIG. 20 shows a diagram that illustrates mode switching with hysteresis in accordance with the invention.

FIG. 20 shows a diagram that illustrates mode switching with hysteresis in accordance with the invention. In one embodiment, mode switching between a single-loop mode and a dual-loop mode is performed using a hysteresis band 2010 to prevent mode-switching oscillations. For example, when in the single-loop mode (indicated at 2002), the system remains in the single-loop mode until the powertrain temperature $T_P$ becomes greater than a stored value of $T_S^{TH}$. TH The system then switches to the dual-loop mode (indicated at 2004). The system remains in the dual-loop mode (indicated at 2006) until $T_P$ becomes less than a stored value of $T_D^{TH}$. The system then switches to the single-loop mode (indicated at 2008). Thus, the hysteresis band 2010 operates to prevent mode-switching oscillations. It should be noted that the hysteresis 2010 is defined by the difference between $T_S^{TH}$ and $T_D^{TH}$, which can be set to any desired value. In one embodiment, the values of $T_S^{TH}$ and $T_D^{TH}$ are the same.

Although the present invention has been described in connection with certain specific embodiments for instructional purposes, the present invention is not limited thereto. For example, in another embodiment, system 10 uses a reversible compressor operable in dual directions instead of compressor 40 and reversing valve 42. In this embodiment, the reversible compressor is a discrete, two-terminal device that performs the same function as the compressor 40 and reversing valve 42. A first terminal of the reversible compressor is coupled to the first and second heat exchangers 14 and 16, and a second terminal of the reversible compressor is coupled to the third and fourth heat exchangers 18 and 20. No separate reversing valve, such as reversing valve 42, is needed in this embodiment. Accordingly, various modifications, adaptations, and combinations of various features of the described embodiments can be practiced without departing from the scope of the invention as set forth in the claims.

What is claimed is:

1. A method comprising:
   setting a compressor speed based on a battery temperature (TB) and a first system pressure (PH);
   setting a fan speed based on a second system pressure (PL) and a powertrain temperature (TP);
   setting a pump speed based on the second system pressure (PL) and the powertrain temperature (TP);
   combining multiple flow paths of a first liquid into a single flow path when the powertrain temperature TP is below a first threshold temperature; and
   splitting the single flow path of the first liquid into the multiple flow paths when the powertrain temperature TP is above a second threshold temperature.

2. The method of claim 1, further comprising:
   providing hysteresis that prevents oscillations between the operations of combining and splitting.

3. A method comprising:
   setting a compressor speed based on a battery temperature (TB) and a first system pressure (PH);
   setting a fan speed based on a second system pressure (PL) and a powertrain temperature (TP);
   setting a pump speed based on the second system pressure (PL) and the powertrain temperature (TP);
   repeating any of the operations of setting of the compressor speed, setting of the fan speed, and setting of the pump speed after a time delay has expired;
   determining the time delay from a system thermal response, wherein the time delay has a value in a range of 0.1 to 60 seconds; and
   selecting a refrigerant flow path through a first condenser or a second condenser, wherein the refrigerant flow path through the first condenser is selected when heat is requested, and wherein the refrigerant flow path through the second condenser is selected when no heat is requested.

4. The method of claim 3, wherein the heat is provided to a vehicle interior that is thermally coupled to the first condenser.

5. The method of claim 1, further comprising:
   causing the liquid to flow through a radiator to decrease the powertrain temperature TP or to bypass the radiator to increase the powertrain temperature TP.

6. The method of claim 5, wherein the powertrain temperature TP is indicative of a motor temperature, a power electronics temperature, or a temperature of a fluid cooling the motor or power electronics.

7. The method of claim 3, wherein the refrigerant flow path is temporarily redirected to the unselected condenser to flush refrigerant from that condenser.

8. A method comprising:
   setting a compressor speed based on a battery temperature (TB) and a first system pressure (PH);
   setting a fan speed based on a second system pressure (PL) and a powertrain temperature (TP);
   setting a pump speed based on the second system pressure (PL) and the powertrain temperature (TP);
   causing the first system pressure PH to approach a setpoint pressure by repeatedly increasing or decreasing a speed of the compressor; and
   causing the second system pressure PL to approach a setpoint by repeatedly increasing or decreasing a flow rate of a first liquid through a chiller evaporator.

9. The method of claim 8, further comprising:
   causing the second system pressure PL to approach a setpoint by repeatedly increasing or decreasing a flow rate of air over a condenser.

10. The method of claim 8, further comprising:
    causing the battery temperature TB to stay within a temperature range by allowing or preventing the first liquid to flow through a chiller evaporator.

11. A two-phase cooling loop system comprising:
    a variable-speed compressor;
    a first evaporator thermally coupled to a first single-phase cooling loop having a pump and a thermal load;
    a second evaporator thermally coupled to a vehicle interior;
    a first condenser thermally coupled to the vehicle interior;
    a second condenser thermally coupled to air outside of the vehicle interior;
    a first plurality of valves allowing or preventing flow of a refrigerant to each evaporator;
    a second plurality of valves directing flow of the refrigerant to the first or second condensers; and
    a second single-phase cooling loop that can be combined with or split from the first single-phase cooling loop, wherein the second single-phase cooling loop includes a variable-speed pump, a thermal load, and a heat exchanger thermally coupled to the air outside of the vehicle interior, wherein the first and second single-phase cooling loops are combined when a powertrain temperature TP is below a first threshold temperature, and wherein the first and second single-phase cooling loops are split when the powertrain temperature TP is above a second threshold temperature.

12. The two-phase cooling loop system of claim 11, wherein the thermal load comprises at least one of a motor and power electronics.

13. The two-phase cooling loop system of claim 11, further comprising:
    a temperature sensor.

14. The two-phase cooling loop system of claim 11, further comprising:
    a pressure sensor coupled to measure pressure between a pump output and a condenser input.

15. The two-phase cooling loop system of claim 11, further comprising:

a pressure sensor coupled to measure pressure between a pump input and an evaporator output.

* * * * *